(12) United States Patent
Krishnan et al.

(10) Patent No.: US 12,189,692 B2
(45) Date of Patent: *Jan. 7, 2025

(54) APPARATUS AND METHOD FOR DISPLAYING MULTIPLE DISPLAY PANELS WITH A PROGRESSIVE RELATIONSHIP USING COGNITIVE PATTERN RECOGNITION

(71) Applicant: ImageScan, Inc., Pasadena, CA (US)

(72) Inventors: Basker S. Krishnan, San Marino, CA (US); Hanoz J. Kateli, Monrovia, CA (US); Bryan Heesch, West Covina, CA (US)

(73) Assignee: ImageScan, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,641

(22) Filed: Apr. 24, 2023

(65) Prior Publication Data

US 2024/0070207 A1 Feb. 29, 2024

Related U.S. Application Data

(63) Continuation of application No. 17/233,530, filed on Apr. 18, 2021, now Pat. No. 11,669,575, which is a continuation of application No. 15/907,265, filed on Feb. 27, 2018, now Pat. No. 11,010,432, which is a continuation-in-part of application No. 15/678,932, filed on Aug. 16, 2017, now Pat. No. 10,459,984, which is a continuation of application No. 13/305,665, filed on Nov. 28, 2011, now Pat. No. 9,772,999, which is a continuation-in-part of (Continued)

(51) Int. Cl.
*G06F 16/93* (2019.01)
*G06F 16/338* (2019.01)
*G06F 16/34* (2019.01)

(52) U.S. Cl.
CPC ............ *G06F 16/93* (2019.01); *G06F 16/338* (2019.01); *G06F 16/34* (2019.01)

(58) Field of Classification Search
None
See application file for complete search history.

(56) References Cited

U.S. PATENT DOCUMENTS 5,771,378 A 6/1998 Holt et al.
5,995,976 A 11/1999 Walker et al.
(Continued)

OTHER PUBLICATIONS

Word 2010 Features and Benefits.
(Continued)

*Primary Examiner* — Kim T Nguyen
(74) *Attorney, Agent, or Firm* — ALONZO & ASSOCIATES; Arlyn Alonzo

(57) ABSTRACT

An apparatus and method for searching and displaying including searching database for at least one document containing a search text; displaying a progressive relationship of a first display with a second display with a third display, wherein the displaying includes the following: the first display presenting the at least one document; the second display presenting only pages from the at least one document, wherein each of the only pages contains the search text; and the third display presenting one of the only pages, and wherein the search text in the one of the only pages is highlighted.

16 Claims, 18 Drawing Sheets

Related U.S. Application Data application No. 13/280,281, filed on Oct. 24, 2011, now Pat. No. 10,467,273.

(56) References Cited

U.S. PATENT DOCUMENTS

| | | | |
|---|---|---|---|
| 5,995,978 | A | 11/1999 | Cullen et al. |
| 6,184,885 | B1 | 2/2001 | DeStefano |
| 6,297,824 | B1 | 10/2001 | Hearst et al. |
| 6,741,985 | B2 | 5/2004 | Green |
| 6,834,276 | B1 | 12/2004 | Jensen et al. |
| 7,373,612 | B2 | 5/2008 | Risch et al. |
| 7,596,574 | B2 | 9/2009 | Sweeney |
| 7,640,550 | B1 * | 12/2009 | Goel ............... H04L 12/1818 715/810 |
| 7,644,373 | B2 | 1/2010 | Jing et al. |
| 7,689,933 | B1 | 3/2010 | Parsons |
| 7,747,428 | B1 | 6/2010 | Karsh et al. |
| 7,870,130 | B2 | 1/2011 | Banerjee et al. |
| 8,005,825 | B1 | 8/2011 | Ghosh |
| 8,259,124 | B2 | 9/2012 | Averett |
| 8,433,705 | B1 * | 4/2013 | Dredze ............ G06F 16/3322 707/723 |
| 8,935,290 | B2 | 1/2015 | Ippili et al. |
| 9,092,428 | B1 | 7/2015 | Zhang |
| 9,142,253 | B2 | 9/2015 | Ubillos |
| 9,483,532 | B1 | 11/2016 | Zhang |
| 9,772,999 | B2 | 9/2017 | Krishnan et al. |
| 10,423,696 | B2 * | 9/2019 | Bishop ............... G06Q 10/107 |
| 10,459,984 | B2 | 10/2019 | Krishnan et al. |
| 10,467,273 | B2 | 11/2019 | Krishnan et al. |
| 10,956,475 | B2 | 3/2021 | Krishnan et al. |
| 11,010,432 | B2 * | 5/2021 | Krishnan ............ G06F 16/34 |
| 11,175,934 | B2 * | 11/2021 | Massoudi .......... H04L 9/3247 |
| 11,645,295 | B2 | 5/2023 | Krishnan |
| 11,669,575 | B2 | 6/2023 | Krishnan et al. |
| 11,969,649 | B2 * | 4/2024 | Manoharan ........... A63F 13/48 |
| 2003/0167279 | A1 | 9/2003 | Smiga et al. |
| 2003/0195980 | A1 | 10/2003 | Geshwind |
| 2004/0001104 | A1 | 1/2004 | Sommerer et al. |
| 2004/0054967 | A1 | 3/2004 | Brandenberger |
| 2004/0093331 | A1 | 5/2004 | Garner et al. |
| 2004/0095376 | A1 | 5/2004 | Graham et al. |
| 2004/0111409 | A1 | 6/2004 | Abe |
| 2004/0133564 | A1 | 7/2004 | Gross |
| 2005/0108001 | A1 | 5/2005 | Aarskog |
| 2005/0138056 | A1 | 6/2005 | Stefik |
| 2005/0149576 | A1 | 7/2005 | Marmaros et al. |
| 2005/0182790 | A1 | 8/2005 | Gilbert et al. |
| 2006/0047651 | A1 | 3/2006 | Milic-Frayling et al. |
| 2006/0080292 | A1 | 4/2006 | Alanzi |
| 2006/0133699 | A1 | 6/2006 | Widrow et al. |
| 2006/0174198 | A1 | 8/2006 | Brown et al. |
| 2006/0277167 | A1 | 12/2006 | Gross |
| 2007/0011149 | A1 | 1/2007 | Walker |
| 2007/0061717 | A1 | 3/2007 | Cragun |
| 2007/0083552 | A1 | 4/2007 | Allen et al. |
| 2007/0179945 | A1 | 8/2007 | Marston et al. |
| 2007/0203945 | A1 | 8/2007 | Louw |
| 2007/0233692 | A1 | 10/2007 | Lisa et al. |
| 2008/0005101 | A1 | 1/2008 | Chandra |
| 2008/0010251 | A1 | 1/2008 | Fontoura et al. |
| 2008/0065636 | A1 | 3/2008 | Miller et al. |
| 2008/0097984 | A1 | 4/2008 | Candelore |
| 2008/0098432 | A1 | 4/2008 | Hardacker et al. |
| 2008/0148147 | A1 | 6/2008 | Poston et al. |
| 2008/0204788 | A1 | 8/2008 | Kelly et al. |
| 2008/0263022 | A1 | 10/2008 | Kostorizos et al. |
| 2008/0301190 | A1 | 12/2008 | Lockhart |
| 2009/0094238 | A1 | 4/2009 | Banerjee et al. |
| 2009/0158181 | A1 | 6/2009 | Becerra et al. |
| 2009/0183115 | A1 | 7/2009 | Iwasaki |
| 2009/0216736 | A1 | 8/2009 | Dexter et al. |
| 2009/0228777 | A1 | 9/2009 | Henry et al. |
| 2009/0287669 | A1 | 11/2009 | Bennett |
| 2009/0313352 | A1 | 12/2009 | Dupont |
| 2010/0094856 | A1 | 4/2010 | Rodrick et al. |
| 2010/0110099 | A1 | 5/2010 | Averett et al. |
| 2010/0246884 | A1 | 9/2010 | Chen et al. |
| 2010/0287150 | A1 | 11/2010 | Downum |
| 2010/0299201 | A1 | 11/2010 | Thrasher |
| 2010/0332515 | A1 | 12/2010 | Carraher et al. |
| 2011/0035383 | A1 | 2/2011 | Ghimire |
| 2011/0035660 | A1 | 2/2011 | Lussier et al. |
| 2011/0119262 | A1 | 5/2011 | Dexter et al. |
| 2011/0246453 | A1 | 6/2011 | Krishnan et al. |
| 2011/0218990 | A1 | 9/2011 | Jordahl |
| 2011/0258049 | A1 | 10/2011 | Ramer et al. |
| 2011/0295879 | A1 | 12/2011 | Logis et al. |
| 2012/0066210 | A1 | 3/2012 | Mukerjee et al. |
| 2012/0078979 | A1 | 3/2012 | Ghimire |
| 2012/0095983 | A1 | 4/2012 | Lee et al. |
| 2012/0150861 | A1 | 6/2012 | Thione |
| 2012/0204104 | A1 | 8/2012 | Walsh |
| 2012/0226500 | A1 | 9/2012 | Balasubramanian et al. |
| 2013/0007004 | A1 | 1/2013 | Rai et al. |
| 2013/0041921 | A1 | 2/2013 | Cooper et al. |
| 2013/0103707 | A1 | 4/2013 | Krishnan et al. |
| 2013/0124515 | A1 | 5/2013 | Ghimire |
| 2015/0160806 | A1 | 6/2015 | Fey et al. |
| 2016/0147848 | A1 | 5/2016 | Krishnan et al. |
| 2017/0140063 | A1 | 5/2017 | Dey et al. |
| 2018/0253427 | A1 * | 9/2018 | Krishnan ............ G06F 16/338 |
| 2019/0361721 | A1 * | 11/2019 | Massoudi .......... H04L 9/3247 |
| 2020/0019547 | A1 * | 1/2020 | Krishnan ............ G06F 16/93 |
| 2020/0019572 | A1 | 1/2020 | Krishnan et al. |
| 2021/0240782 | A1 * | 8/2021 | Krishnan ............ G06F 16/34 |
| 2022/0043663 | A1 * | 2/2022 | Massoudi ............ H04L 9/32 |
| 2023/0273945 | A1 * | 8/2023 | Okerlund ........... G06F 16/332 707/728 |
| 2024/0070207 | A1 * | 2/2024 | Krishnan ............ G06F 16/34 |
| 2024/0070208 | A1 * | 2/2024 | Krishnan ............ G06F 16/93 |

OTHER PUBLICATIONS

Adobe Acrobat 9 Standard Advanced Search Options.
Adobe Acrobat 9 Standard Find Text in a PDF.
Adobe Acrobat 9 Standard Find Text in multiple PDFs.
Adobe Acrobat 9 Standard Search Features Overview.
Thomas Macentee: "Google Books for Genealogy", Sep. 3, 2011, pp. 1-7, XP055188474, retrieved from Internet: URL:http://web.archive.org/web/20110903063944/http://www.archives.com/experts/macentee-thomas/google-books-for-genealogy.html [retrieved May 11, 2015].
Anonymous: "efTwo (F2) Finds Multiple Words & Their Inflections on a page [Chrome]", Aug. 10, 2011, pp. 1-6, XP055407982, retrieved from the Internet : URL:http://web.archive.org/web/20110810224803/https://www.additivetips.com/internet-tips/eftwo-f2-finds-multiple-words-their-inflections-on-a-page-chrome/ [retrieved on Sep. 19, 2017].
CN101770514A, Published Jul. 7, 2010.
CN101216837A, Published Jan. 18, 2008.
Antiqueira et al. "Complex Network Approach to Text Summarization", Published Feb. 15, 2009.
Youguo et al. "The Frame of Cognitive Pattern Recognition", Published Jul. 26, 2007.
*Electric Power Group* v *Alstrom* (District Court, California Central District, No. 2:12-cv-06365-JGB (Aug. 1, 2016)).
*Intellectual Ventures* v *Capital One Financial Corp* (District Court, Dist of Maryland, No. 8:14-cv-00111-PWG (Mar. 7, 2017)).
Pratt et al., "A Knowledge-Based Approach to Organizing Retrieved Documents" (1999).
Baeza-Yates et al. "Modern Information Retrieval" 1999, ACM Press.

* cited by examiner

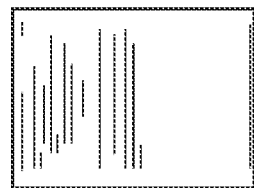
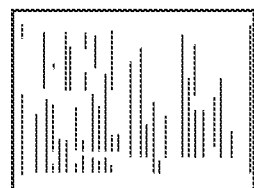
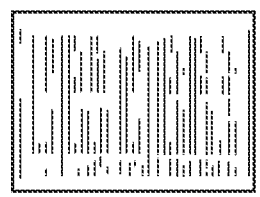
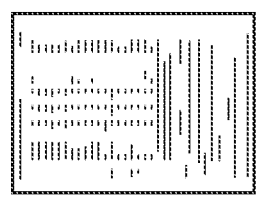
FIG.2
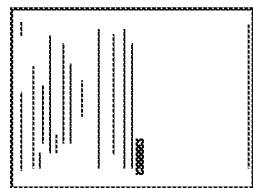
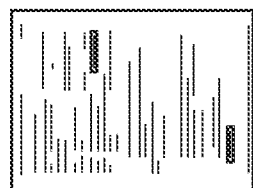
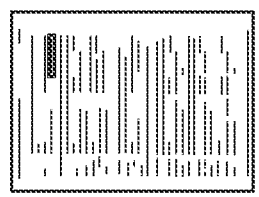
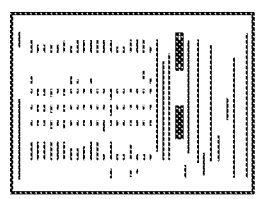
FIG.3

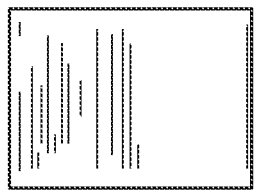
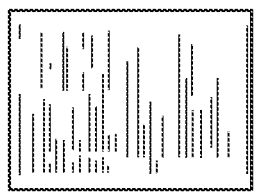
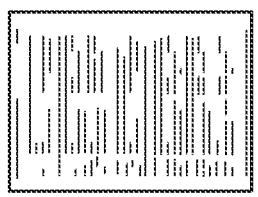
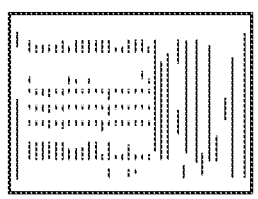
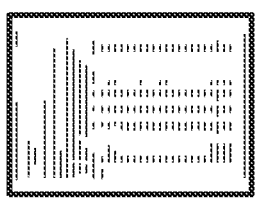
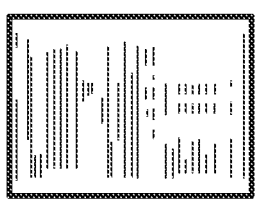
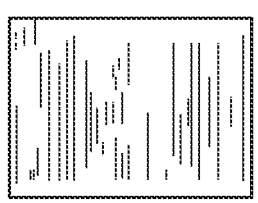
FIG.4
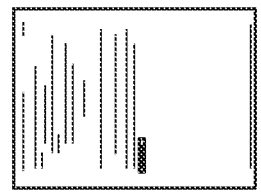
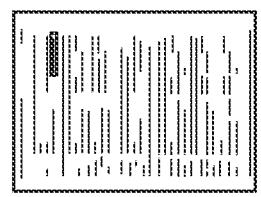
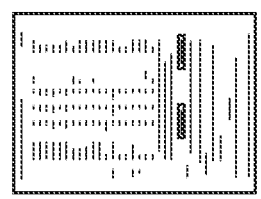
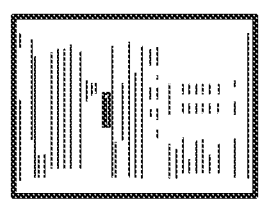
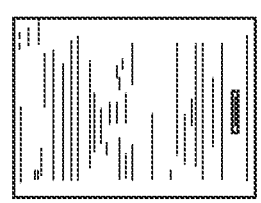
FIG.5

FIG. 14c

APPARATUS AND METHOD FOR DISPLAYING MULTIPLE DISPLAY PANELS WITH A PROGRESSIVE RELATIONSHIP USING COGNITIVE PATTERN RECOGNITION

CLAIM OF PRIORITY UNDER 35 U.S.C. § 120

The present Application for Patent continuation of Patent Application No. 17,233,530 entitled "Apparatus and Method for Displaying Multiple Display Panels With a Progressive Relationship Using Cognitive Pattern Recognition" filed on Apr. 18, 2021, pending, which is a continuation of patent application Ser. No. 15/907,265 entitled "Apparatus and Method for Displaying Multiple Display Panels With a Progressive Relationship Using Cognitive Pattern Recognition" filed on Feb. 27, 2018 which issued as U.S. Pat. No. 11,010,432 on May 18, 2021, and which is a continuation in part of patent application Ser. No. 15/678,932 entitled "Apparatus and Method for Displaying Multiple Display Panels With a Progressive Relationship Using Cognitive Pattern Recognition" filed Aug. 16, 2017, issued as U.S. Pat. No. 10,459,984 on Oct. 29, 2019 which is a continuation of patent application Ser. No. 13/305,665 entitled "Apparatus and Method for Displaying Multiple Display Panels With a Progressive Relationship Using Cognitive Pattern Recognition" filed Nov. 28, 2011 and issued as U.S. Pat. No. 9,772,999 on Sep. 26, 2017 which is a continuation in part of patent application Ser. No. 13/280,281 entitled "Apparatus and Method for Displaying Search Results Using Cognitive Pattern Recognition in Locating Documents and Information Within" filed Oct. 24, 2011, issued as U.S. Pat. No. 10,467,273 on Nov. 5, 2019 and all assigned to the assignee hereof and hereby expressly incorporated by reference herein as if fully set forth below and for all applicable purposes.

FIELD

The present disclosure relates generally to apparatus and methods for visual presentation of search results. More particularly, the disclosure relates to visually presenting search results to enable use of cognitive pattern recognition.

BACKGROUND

In current document files, it is known that many documents with similar or even identical words exist. Thus, with the commonality of words and phrases in different documents or even different versions of the documents, it is time consuming to find an exact document quickly and efficiently. Often, a keyword search could produce a list of many documents with the same word and even include all the various versions of the different documents containing the keyword. This is especially problematic if the keyword used in the search is a common word for a particular application. Additionally, a document may include one or more attachments. In conventional searching and presentation of search results, there is no differentiation of whether the locations of the keyword are in the document and/or in the one or more attachments.

SUMMARY

Disclosed is an apparatus and method for searching and displaying results using cognitive pattern recognition. According to one aspect, a method for searching and displaying using cognitive pattern recognition including searching for at least one document with at least one search text, wherein each of the at least one search text is associated with a highlight option; selecting to enable or to disable the highlight option for each of the at least one search text; displaying a progressive relationship of the at least one document in scaled common image format (CIF), wherein displaying the progressive relationship includes displaying the following: a first display presenting the at least one document, wherein each of the at least one document includes all of the at least one search text; a second display presenting only pages from the at least one document where the only pages presented include one or more of the at least one search text with its associated highlight option enabled; and a third display presenting one page from the only pages wherein all occurrences of the search text where the highlight option for the search text is enabled are displayed simultaneously on the page.

According to another aspect, an apparatus for searching and displaying using cognitive pattern recognition, the apparatus comprising a processor and a memory, the memory containing program code executable by the processor for performing the following: searching for at least one document with at least one search text, wherein each of the at least one search text is associated with a highlight option; selecting to enable or to disable the highlight option for each of the at least one search text; displaying a progressive relationship of the at least one document in scaled common image format (CIF), wherein displaying the progressive relationship includes displaying the following: a first display presenting the at least one document, wherein each of the at least one document includes all of the at least one search text; a second display presenting only pages from the at least one document where the only pages presented include one or more of the at least one search text with its associated highlight option enabled; and a third display presenting one page from the only pages wherein all occurrences of the search text where the highlight option for the search text is enabled are displayed simultaneously on the page.

According to another aspect, a method for searching and displaying an email string, the method including a user inputting at least one search text, wherein one of the at least one search text is associated with a highlight option; searching the email string with the at least one search text, wherein the email string comprises at least one email, and wherein the at least one email includes at least one email information, at least one email body and at least one email attachment; and displaying the email sting in a horizontal manner on a display, wherein the display comprises a first column, a second column and a third column, and wherein the first column displays the at least one email information, the second column displays the at least one email body and the third column displays one or more of the at least one email attachment, and wherein the at least one search text is found in one of the at least one email information, the at least one email body or the at least one email attachment.

In one example, the method further includes enabling the highlight option. In one example, the at least one search text is found in the at least one email attachment. In one example, the at least one email attachment includes a first email attachment and a second email attachment, wherein the at least one search text is found in the first email attachment and the at least one search text is not found in the second email attachment. In one example, the second email attachment is displayed in phantom format. In one example, the first email attached is displayed as multiple pages. In one example, the method further includes displaying a symbol on the multiple pages for indicating that the at least one search text is found on the multiple pages. In one example, the method further includes sorting the at least one email attachment by document type. In one example, the display includes a fourth column and wherein the first email attachment is a first document type and the second email attachment is a second document type. In one example, the method further includes displaying the first email attachment in the third column and displaying the second email attachment in the fourth column. In one example, the method further includes flipping the display from the horizontal manner to a vertical manner.

Advantages of the present disclosure may include reducing the steps and time needed to search for an object (e.g., a document) or information within the object. Another advantage may include increased accuracy and built in fault tolerance, for example, for OCR (optical character recognition) errors and misfiles in locating an object or information within the object.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 2 illustrates a first example of pages of at least one or more document where the search text exists wherein a highlight option is disabled.

FIG. 3 illustrates a first example of pages of at least one or more document where the search text exists wherein a highlight option is enabled.

FIG. 4 illustrates the first example of FIG. 2 where some of the pages are presented with a visual distinction (i.e., in a different format) than the rest of the pages.

FIG. 5 illustrates the second example of FIG. 3 where some of the pages are presented with a visual distinction (i.e., in a different format) than the rest of the pages.

FIGS. 14*a-c* illustrate an example of a set of documents displayed from a search result in accordance with the three displays described in FIG. 12.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

A search may be based on not just words contained in a document, but also the user's memory of a visual image of the document and/or the approximate date of the document. For example, different documents or versions of a same document may contain many identical keywords. However, the visual presentation (i.e., display) of the first page (or any other page) of different documents or types of documents may differ. Thus, there's a need for a search & display approach that can utilize the aspects of keyword searching and visual presentation (i.e., display) of the document being searched to quickly and efficiently locate the document in a document repository (e.g., database.). For example, the human brain can quickly identify the visual pattern of a needed document(s) using cognitive pattern recognition (CPR), and distinguish between like document patterns using metadata tags displayed alongside the document display in scaled CIF. One skilled in the art would understand that a document repository may include an electronic repository or an electronic database.

Figure 1:
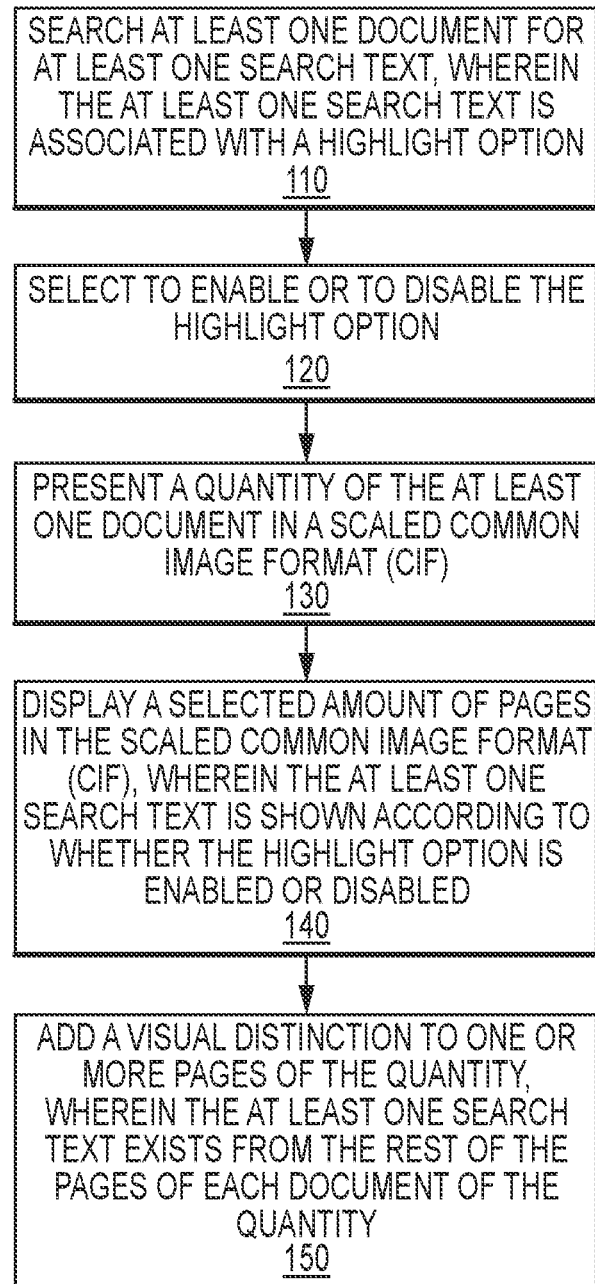
FIG. 1 illustrates a first example of a flow diagram for searching and displaying results using cognitive pattern recognition.

FIG. 1 illustrates a first example of a flow diagram 100 for searching and displaying results using cognitive pattern recognition. In block 110, search at least one document for at least one search text, wherein the at least one search text is associated with a highlight option. In one example, the highlight option allows a user to determine which search text should be differentiated from the remaining text of a document when the search text found within the document. The differentiation allows a user to quickly distinguish the search text from the rest of the remaining text. In one example, the search text with the highlight option enabled is differentiated from the remaining text of the document in one or more of the following manner: highlighted by a different color (i.e., color differentiation), bolded, italicized, underlined, etc. One skilled in the art would understand that the list of ways to "differentiate" a text from the remaining text as presented herein is not an exclusive list and that other manners of differentiating a search text may be part of the highlight option without affecting the scope and/or spirit of the present disclosure.

In one example, the highlight option includes a color differentiation (e.g., a yellow color) added to a search text. In another example, the highlight option includes varying the fonts, the mark-ups, or an added visual distinction to the search text. In yet another example, the highlight option includes adding a border around the search text. One skilled in the art would understand that the examples listed of the highlight option are not limiting and that other examples of differentiating a search text from the rest of the text on a page of a document are within the spirit and scope of the present disclosure.

In one aspect, different search text may be associated with different highlight options. For example, a first search text may be highlighted in yellow while a second search text may be bolded. One skilled in the art would understand that multiple search text may be associated with different highlight options, that is, with different examples of distinguishing the multiple search text from each.

A "search text" as used in the present disclosure may be a single word, a collection of words (i.e., a phrase of contiguous words), a symbol, a regular expression, a number, a special character and/or any combination thereof. In one aspect, the at least one search text comprises multiple search text to be searched concurrently with one or more documents. In one example, a search text (a.k.a. search term) is a keyword, a date or date range, a metadata, etc. As used in the present disclosure, the terms "search text" and "search term" are synonymous and used interchangeably.

In one aspect, the at least one document is searched based on one or more of the following: an attribute, an attribute range or a special definition. For example, an attribute may be a significant identifier such as a social security number and the search might involve a single, multiple (within a range) or all SSNs within documents in a repository. For example, an attribute may be a special symbol or a special character. For example, an attribute range may be all dates within a specified range (e.g., from Jan. 1, 2000-Dec. 30, 2010). For example, an attribute range may be all amounts found within a range (e.g., $50,000 to $100,000 or 1 liter to 1000 liters, etc.) within documents. In one aspect, the special definition may be a list of predefined synonyms. In another aspect, the special definition may be a list of antonyms.

Following block 110, in block 120, select to enable or to disable the highlight option. In one example, the highlight option associated with one search text is enabled, such that, for example, the search text would be highlighted in yellow each time it occurs on a page of a document of a repository or database. In one example, the repository is the Internet. In another example, the repository is a private database. In one example with multiple search text, each of the search text is associated with a highlight option which may be enabled or disabled. And, in another example, multiple search text with their highlight option enabled may be differentiated differently (i.e., distinctly) from each other. For example, a first search text with its highlight option enabled may be bolded, a second search text with its highlight option enabled may be underlined, a third search text with its highlight option enabled may be italicized. And, another search text may have its highlight option disabled such that it is not differentiated from the remaining text (non-searched text) of the document.

In block 130, present a quantity of the at least one document in a scaled common image format (CIF). One skilled in the art would understand that presenting a quantity of the at least one document (as defined in block 130) may include presenting one or more documents.

In one aspect, a scaled common image format (CIF) is a digital representation of a document which retains the look and feel of the document in a printed form or it is a visual representation of the pages within digitally converted paper or electronically created documents. In one example, the first page of each of the quantity of the searched documents is presented in the scaled common image format (CIF). In one example, a first page of each of the quantity of the searched documents is presented in the scaled common image format (CIF). In one example, the presenting of the quantity is done in a predetermined order. And, in one example, the predetermined order is based on a metadata parameter. In one aspect, at least one metadata parameter is presented along with the scaled common image format (CIF). In another aspect, a portion of a metadata parameter is presented along with the scaled common image format (CIF). In one example, the metadata parameter is modified before being presented. In one aspect, the at least one metadata parameter is a date information. The date information, for example, may be a date the document is created, a date contained within the document, a date the document is processed, such as scanned, or a date assigned to the document, etc.

Following block 130, in block 140, display a selected amount of pages in the scaled common image format (CIF), wherein the at least one search text is shown according to whether the highlight option is enabled or disabled. In one example, the selected amount is the pages wherein the at least one search text exists on each of the pages and wherein the search text is presented with the highlight option enabled. In one example, the selected amount is a chosen quantity of pages, and may range, for example, from a single page to multiple pages. In one example, the selected amount of pages is from a single document.

Following block 140, in block 150, add a visual distinction to one or more pages of the quantity where the at least one search text exists from the rest of the pages of each document of the quantity. In one example, the selected amount includes all the pages with the added visual distinction. In one example, the selected amount is from a single document.

One skilled in the art would understand that although the steps in blocks 110 through 150 are written in a particular order (the step in block 150 follows the step in block 140 which follows the step in block 130 which follows the step in block 120 which follows the step in block 110), the order of the steps may be interchanged without affecting the scope or spirit of the present disclosure. In one aspect, some of the steps in FIG. 1 are performed by a computer, such as a personal computer. In another aspect, some of the steps in FIG. 1 are performed by a handheld device that incorporates at least one processor.

FIG. 2 illustrates a first example of pages of at least one or more document where the search text exists. In this example of FIG. 2, the highlight option of the search text is disabled. FIG. 3 illustrates a second example of pages of at least one or more document where the search text exists. In this example of FIG. 3, the highlight option of the search text is enabled.

FIG. 4 illustrates the first example of FIG. 2 where some of the pages are presented with a visual distinction (i.e., in a different format) than the rest of the pages. As illustrated in FIG. 4, the second and third pages are presented with borders. In one aspect, a user determines whether some of the pages are to be presented in the different format. Furthermore, the user may determine what the different format should be, for example, in using borders or some other different formatting. And, the user may determine the one or more criteria for some of the pages to be presented in the different format. One skilled in the art would understand that other forms of different formats, not limited to borders as illustrated herein, may be used without restricting the scope and spirit of the present disclosure.

FIG. 5 illustrates the second example of FIG. 3 where some of the pages are presented with a visual distinction (i.e., in a different format) than the rest of the pages. As illustrated in FIG. 5, the second and third pages are presented with borders where the highlight search text is found. In one aspect, a user determines whether some of the pages are to be presented in the different format. Furthermore, the user may determine what the different format should be, for example, in using borders or some other different formatting. And, the user may determine the one or more criteria for some of the pages to be presented in the different format. One skilled in the art would understand that other forms of different formats, not limited to borders as illustrated herein, may be used without restricting the scope and spirit of the present disclosure.

In one aspect, cognitive pattern recognition is based on prior cognitive knowledge. For example, recognition is based on a collective memory about the document being searched. The cognition pattern being recognized may be based on memory of one or more of the following: file format (e.g., Word, Excel etc.), approximate date of the document (last month, last quarter, last year etc.), from and to details on correspondence/email/fax, keywords within documents, key sections within documents (e.g., pricing details within a proposal or termination clause within a contract); memory of how various digital file formats look.

In another example, recognition is based on cognitive intelligence. For example, the search is for a document that one is not familiar with, however aspects of the document are known to the searcher. In one example, the search is for a tax form, a court document or a lab report, etc., wherein each has its unique image pattern that is easily recognizable. In another example, the location of the search text (e.g., highlighted keyword(s)) within a page in common image format allows cognitive pattern recognition. Based on common image format (e.g., miniature visual display) of documents containing highlighted keyword(s), one can quickly recognize and comprehend the relevance of various documents like Correspondence, Presentations, Proposals Cost Estimates for Cleanup etc. as events on a time line or as a relevant document pertaining to an issue.

Figure 7:
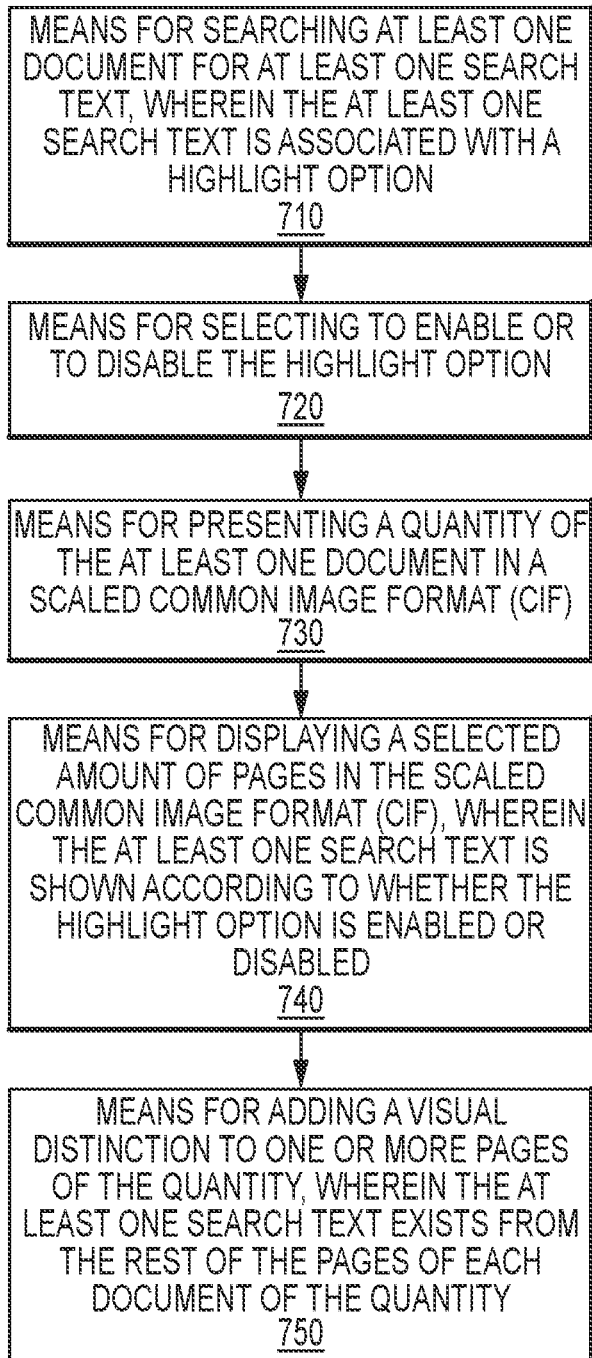
FIG. 7 illustrates an example of a device suitable for searching and displaying results using cognitive pattern recognition in the flow diagram illustrated in FIG. 1.

FIG. 7 illustrates an example of a device 700 suitable for searching and displaying results using cognitive pattern recognition in the flow diagram illustrated in FIG. 1. In one aspect, the device 700 is implemented by at least one processor comprising one or more modules configured to search using cognitive pattern recognition as described herein in blocks 710, 720, 730, 740 and 750. For example, each module comprises hardware, firmware, software, or any combination thereof. In one aspect, the device 700 is also implemented by at least one memory in communication with the at least one processor.

Figure 8:
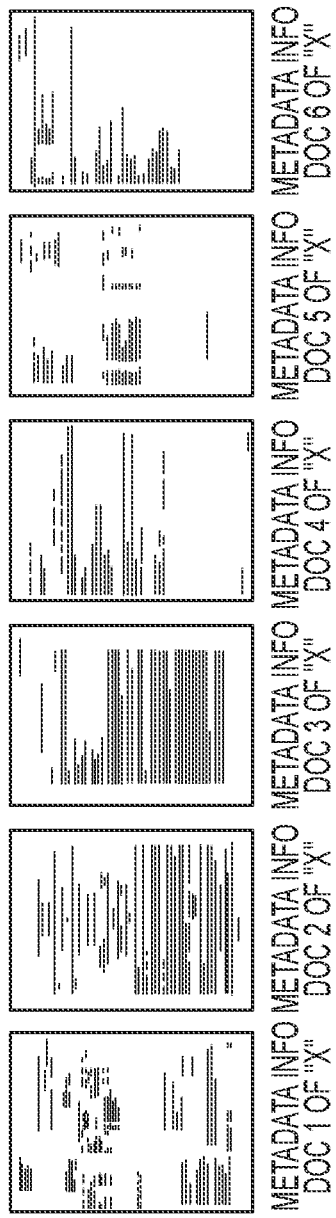
FIG. 8 illustrates a first example of a set of documents displayed from a search result.

FIG. 8 illustrates a first example of a set of documents displayed from a search result. In this first example, illustrated in FIG. 8, the set of documents are displayed in a scaled common image format (CIF) with metadata information in the image tag.

Figure 9:
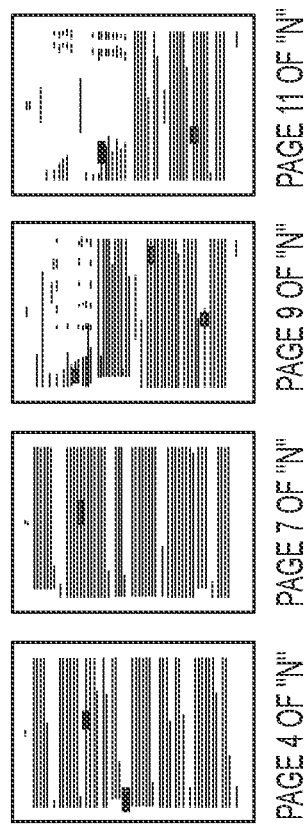
FIG. 9 illustrates a second example of a set of documents displayed from a search result.

FIG. 9 illustrates a second example of a set of documents displayed from a search result. In this second example, the set of documents may be displayed in a scaled CIF with metadata information in the image tag. For example, in FIG. 9, only the pages with the search text (e.g., keyword(s)) that are marked are displayed.

Figure 10:
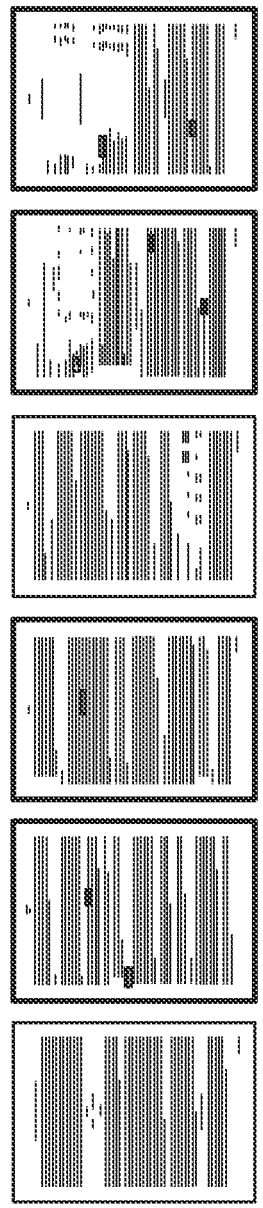
FIG. 10 illustrates a third example of a set of documents displayed from a search result.

FIG. 10 illustrates a third example of a set of documents displayed from a search result. In this third example, the set of documents may be displayed in a scaled CIF with metadata information in the image tag. For example, in FIG. 10, the pages with all the search text (e.g., keyword(s)) found are displayed. In one example, the display includes pages with the search text the highlight option enabled as well as the search text with the highlight option disabled. In one example, the search text with the highlight option enabled is displayed differently than the search text with the highlight option disabled.

Figure 11:
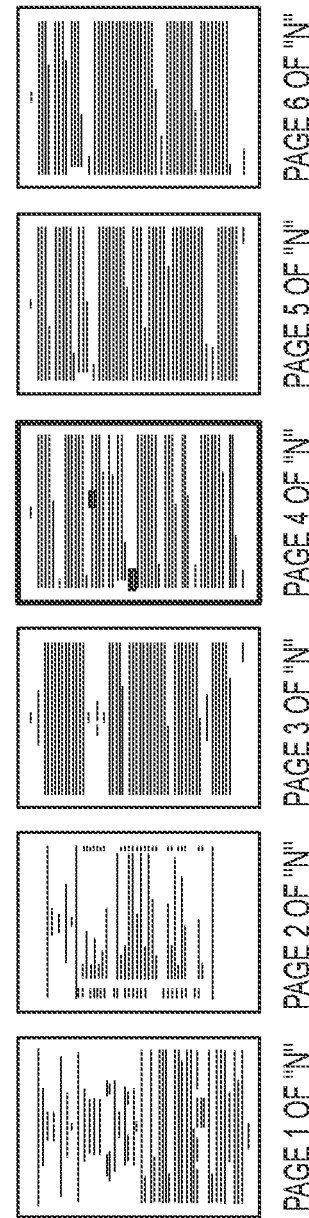
FIG. 11 illustrates a fourth example of a set of documents displayed from a search result.

FIG. 11 illustrates a fourth example of a set of documents displayed from a search result. In this fourth example, the set of documents may be displayed in a scaled CIF with metadata information in the image tag. For example, as illustrated in FIG. 11, all the pages within a document are displayed. This includes pages with the search text the highlight option enabled as well as the search text with the highlight option disabled. In one example, the search text with the highlight option enabled is displayed differently than the search text with the highlight option disabled.

Figure 12:
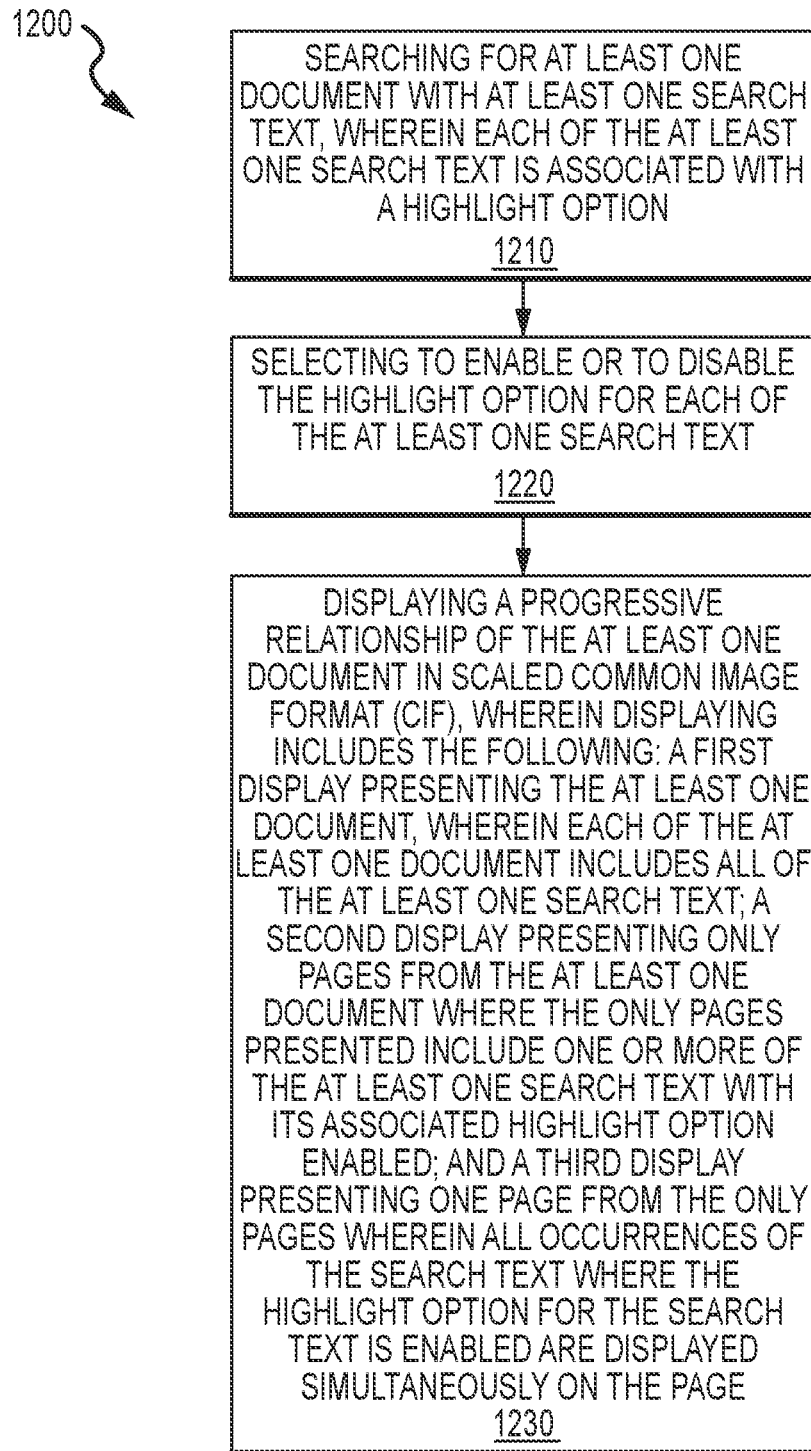
FIG. 12 illustrates a second example of a flow diagram for searching and displaying results using cognitive pattern recognition.

FIG. 12 illustrates a second example of a flow diagram 1200 for searching and displaying results using cognitive pattern recognition. In block 1210, search for at least one document with at least one search text. In one example, the at least one document is from a repository. For example, the repository is the Internet. In another example, the repository is a private database. In one example, the searching is based on one or more of the following: an attribute, an attribute range or a special definition. Some examples of an attribute, an attribute range or a special definition are presented above in the present disclosure.

In one example, each of the at least one search text is associated with a highlight option. In one example, the at least one document does not include any document with an excluded text. In one example, if a document includes an excluded text, the document is excluded from being presented in one or more of the displays. For example, if a document includes an excluded text, the document would not be presented in a display. In one aspect, an "excluded text" as used in the present disclosure may be a single word, a collection of words (i.e., a phrase of contiguous words), a symbol, a regular expression, a number, a special character and/or any combination thereof.

In block 1220, select to enable or to disable the highlight option for each of the at least one search text. In one example, the at least one search text is a multiple search text. With multiple search text, each of the search text is associated with a highlight option which may be enabled or disabled. And, in another example, multiple search text with their highlight option enabled may be differentiated differently (i.e., distinctly) from each other. For example, a first search text with its highlight option enabled may be bolded, a second search text with its highlight option enabled may be underlined, a third search text with its highlight option enabled may be italicized. And, another search text may have its highlight option disabled such that it is not differentiated from the remaining text (non-searched text) of the at least one document. In yet another option, when the highlight option is enabled, a color differentiation is added to the associated search text associated with that highlight option.

In block 1230, displaying a progressive relationship of the at least one document in scaled common image format (CIF). In one example, displaying the progressive relationship includes displaying the following: a first display presenting the at least one document, wherein each of the at least one document includes all of the at least one search text; a second display presenting only pages from the at least one document where the only pages presented include one or more of the at least one search text with its associated highlight option enabled; and a third display presenting one page from the only pages wherein all occurrences of the search text where the highlight option for the search text is enabled are displayed simultaneously on the page.

In one example, the only pages that are presented in the second display do not include any page with an excluded text. In one example, the only pages presented in the second display are all from a single document selected from the at least one document presented in the first display. For example, a user may select the single document from the at least one document. The single document may be visually differentiated in the first display from the remaining documents presented in the first display. In one example, the single document is differentiated, for example, by a border drawn around its CIF image. One skilled in the art would understand that other manners of differentiating may be used without affecting the scope and/or spirit of the present disclosure.

In one example, all of the at least one search text where the highlight option is enabled are displayed simultaneously on each of the only pages in the second display.

In one example, the one page presented in the third display is selected for presenting by a user. In another example, the one page presented in the third display is selected a priori, for example, by a predefined rule. In one example, the one page from the only pages is visually differentiated in the second display from the remaining only pages. In one example, the one page is differentiated, for example, by a border drawn around its CIF image. One skilled in the art would understand that other manners of differentiating may be used without affecting the scope and/or spirit of the present disclosure.

In one example, the at least one document presented in the first display does not include any document with a first excluded text and the only pages presented in the second display do not include any page with a second excluded text. In one example, the first excluded text is different from the second excluded text.

In one aspect, a display (such as the first display, second display and/or third display) is a collection of one or more congruent controls used for the purpose of displaying data in a cognitive format. In one example, a display is a partial or complete display area supported by a device using the viewing application. For example, it may be a single display panel or multiple display panels connected to the device. In one example, a display is a viewable area on a computer monitor. And, in one example, multiple displays may include sub dividing the same viewable area into multiple adjacent sub areas or display panels.

Figure 13:
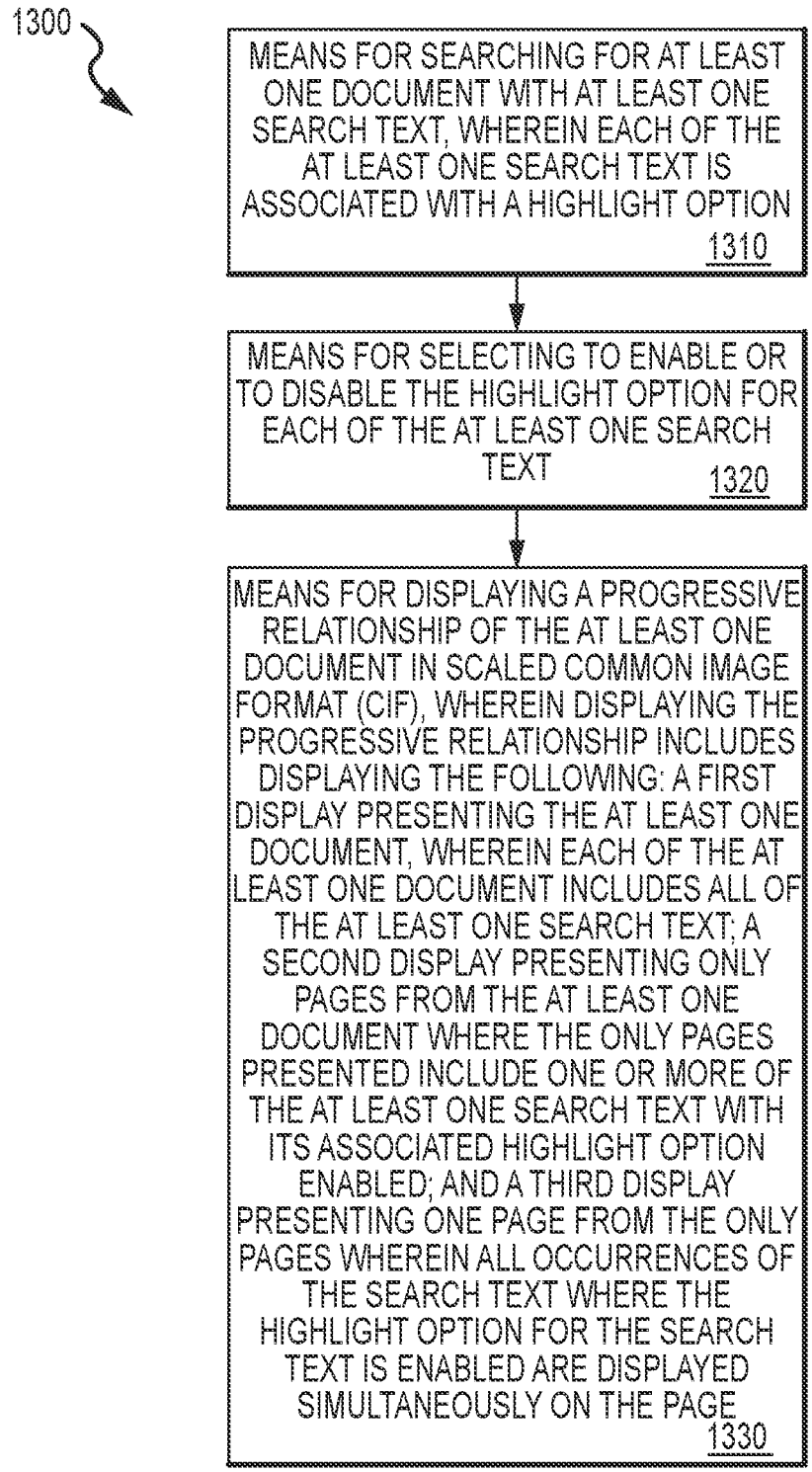
FIG. 13 illustrates an example of a device suitable for searching and displaying results using cognitive pattern recognition in the flow diagram illustrated in FIG. 12.

FIG. 13 illustrates an example of a device 1300 suitable for searching and displaying results using cognitive pattern recognition in the flow diagram illustrated in FIG. 12. In one aspect, the device 1300 is implemented by at least one processor comprising one or more modules configured to search using cognitive pattern recognition as described herein in blocks 1310, 1320 and 1330. For example, each module comprises hardware, firmware, software, or any combination thereof. In one aspect, the device 1300 is also implemented by at least one memory in communication with the at least one processor.

Figure 14A:
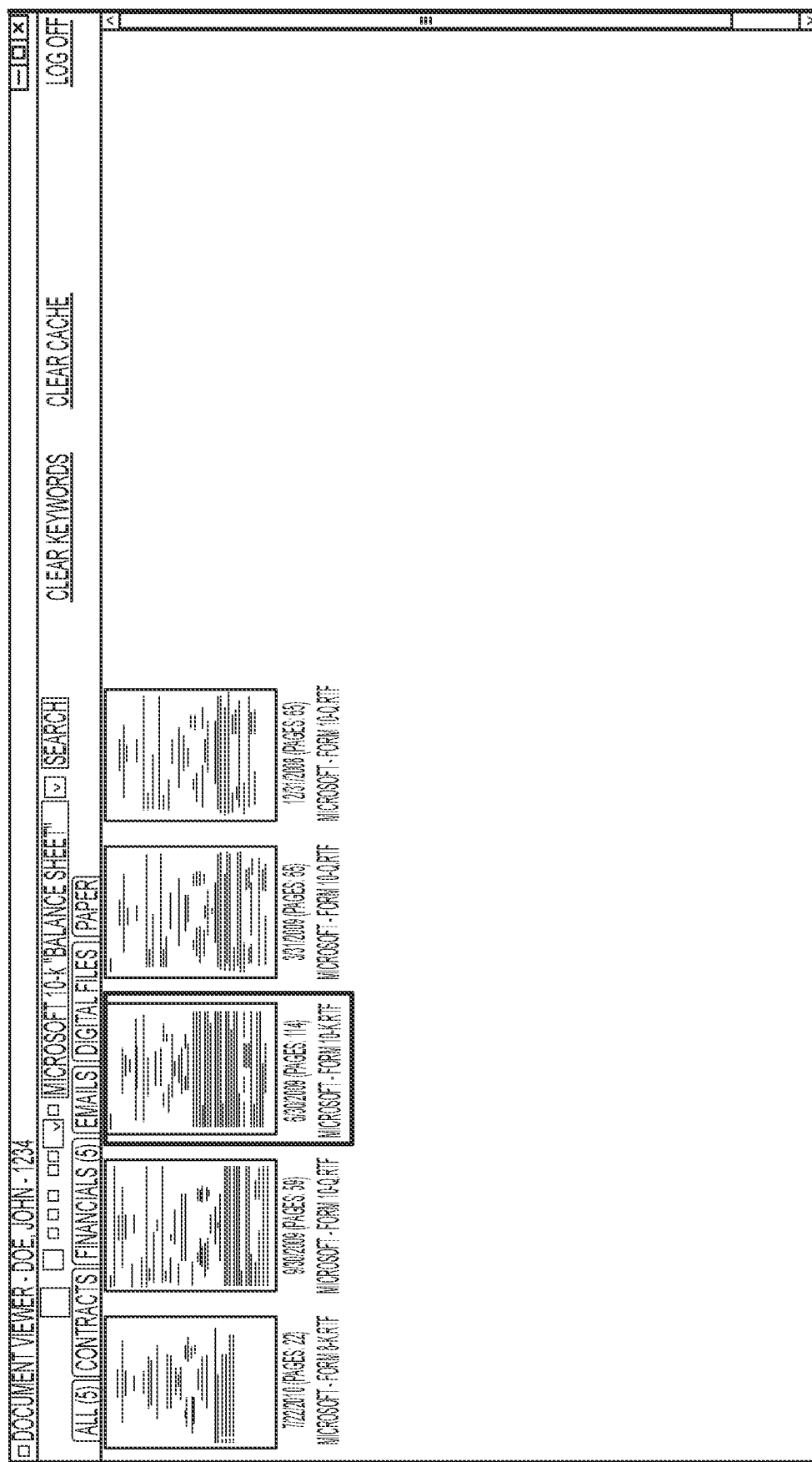
Figure 14B:
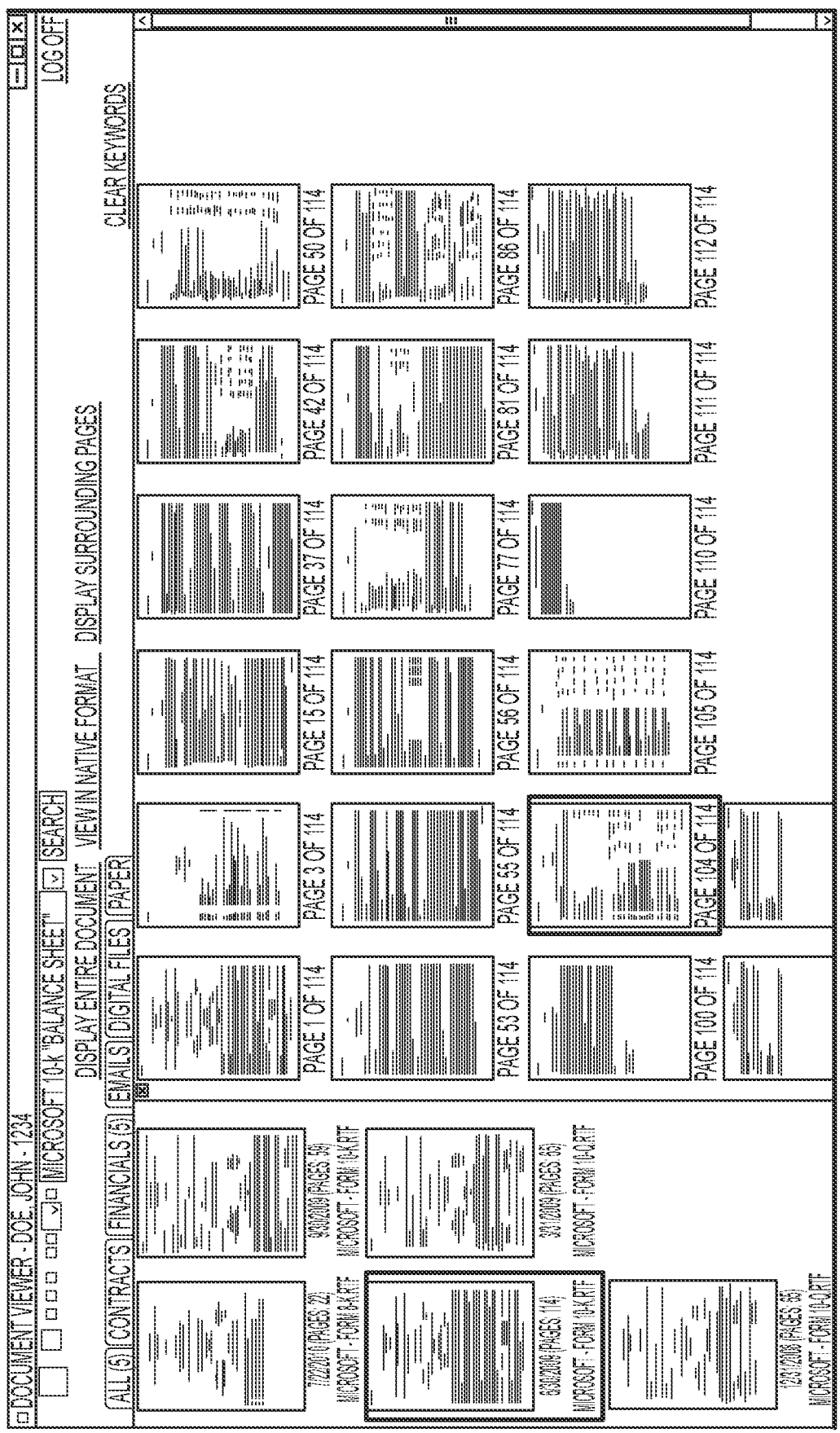
Figure 14C:
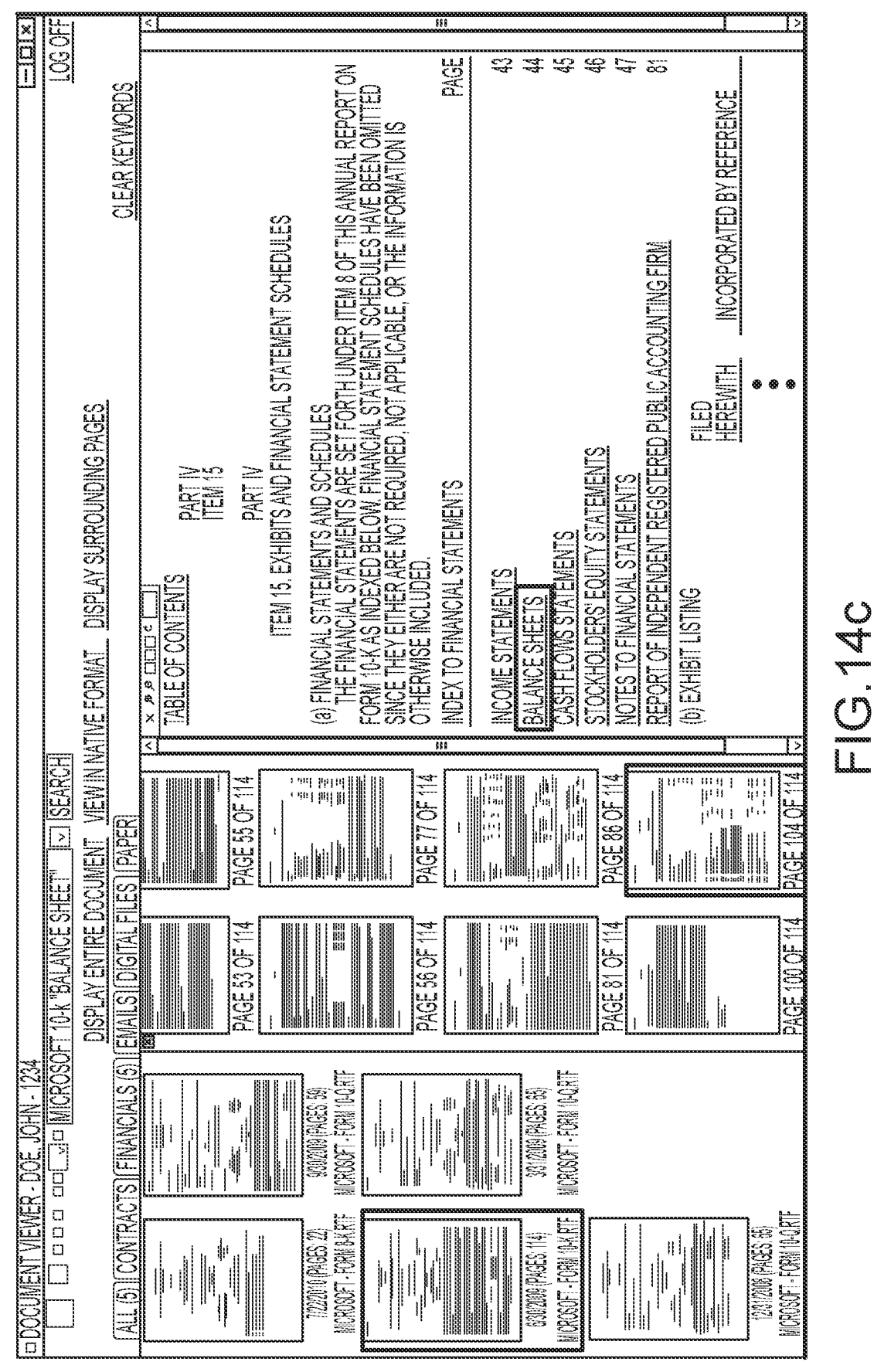

FIGS. 14a-c illustrate an example of a set of documents displayed from a search result in accordance with the three displays described in FIG. 12. In FIG. 14a, a first display is illustrated. As shown in the example of FIG. 14a, five documents are found in the search result. A representative page of each of the five documents is illustrated in the first display. In FIG. 14a, the third document is presented with a differentiation (e.g., a color border) from the remaining documents. In FIG. 14b, the first display is illustrated on the left side and a second display is illustrated on the right side. In the second display, some or all of the pages of the third document (presented in the first display) are presented in second display. In the example of FIG. 14b, one of the pages is presented with a differentiation (e.g., a color border) from the remaining pages presented in the second display. In FIG. 14c, the first display is illustrated on the left side, the second display is illustrated in the middle, and the third display is illustrated on the right side. In the third display, the page that is presented with a differentiation in the second display is now presented in the third display by itself. One skilled in the art would understand that although the presentation of the first, second and third displays are from left to right, that other arrangements of the displays (e.g., from top to bottom, etc.) are also within the scope and spirit of the present disclosure.

In one aspect, a document may include one or more attachments. In one aspect, a document is an e-mail with or without attachments associated with the e-mail. An attachment associated with an email is labeled as an email attachment. In another aspect, a document is a string of e-mails (i.e., "email string") with or without email attachments. In one example, an e-mail includes an email body and any e-mail attachments associated with the e-mail. That is, an e-mail body includes the content of an e-mail minus the e-mail attachment(s). In one example, an e-mail string is a set of related emails with all their respective attachments. In one example, emails are related (i.e., "related emails") if they belong to the same email thread. That is, emails are related if they are part of a running list of all the successive replies starting with an original email. In the present disclosure, the original email is part of the email string.

Figure 15:
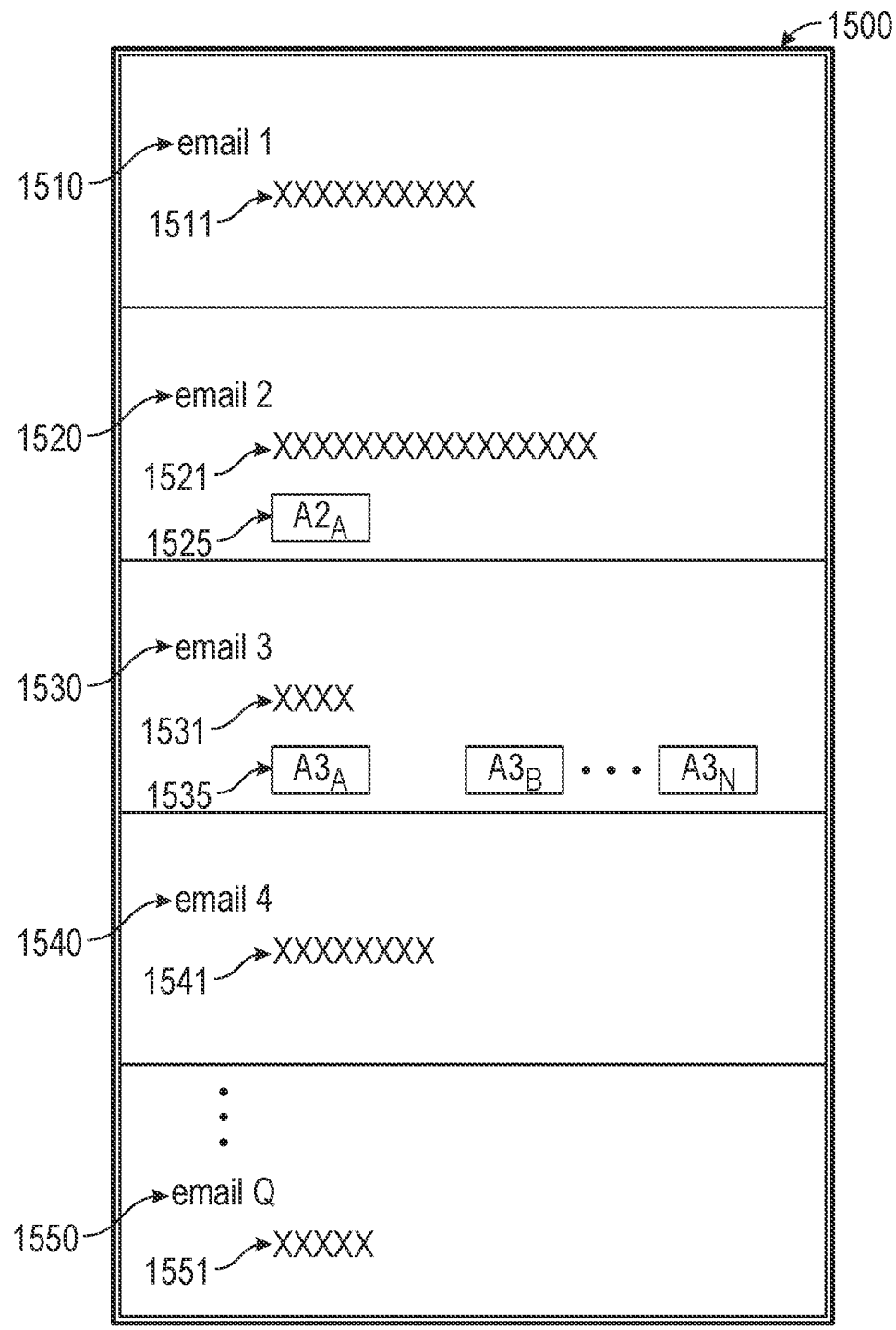
FIG. 15 illustrates an example display of an e-mail string in a vertical manner.

FIG. 15 illustrates an example display 1500 of an e-mail string in a vertical manner. As shown in FIG. 15, the email string is displayed in a column format, for example, display in a single column. That is, the email string (which includes email bodies and email attachments) is displayed vertically in a column format. Although the example of FIG. 15 shows the email string displayed in a single column, one skilled in the art would understand that an email string may be divided into parts such that part one of the email string is displayed in column one, part two of the email string is displayed in column two, part three of the email string is displayed in column three, etc. and the email string in its totality is displayed in a vertical manner.

In the example of FIG. 15, the e-mail string includes Q quantity of e-mails which are labeled as email1 through emailQ. As labeled in FIG. 15, email1 is labeled as 1510, email2 is labeled as 1520, email3 is labeled as 1530, e-mail4 is labeled as 1540, emailQ is labeled as 1550. One skilled in the art would understand that "Q" could include any quantity of emails in the e-mail string. As shown in FIG. 15, email1 1510 includes email body 1511, email 1520 includes email body 1521 and one email attachment 1525 labeled as "$A2_A$", email3 1530 includes e-mail body 1531 and N quantity of email attachments 1535 labeled as "$A3_A, A3_B \ldots A3_N$", email4 1540 includes email body 1541, and emailQ 1550 includes email body 1551. One skilled in the art would understand that "N" could include any quantity of email attachments.

In one example, the relationship of the plurality of emails in the email string is displayed in a vertical manner, for example, in a chronological sequence from either top to bottom or bottom to top. For example, the email with the oldest chronological date may appear on the bottom while the email with the latest chronological date may appear on the top of the display, or vice versa. A display of an email string in a vertical manner is defined as displaying the relationship of each email (i.e., email bodies with their respective email attachments) in the e-mail string vertically as shown in FIG. 15.

In one example, the email string is flipped from a vertical display to a horizontal display. Flipping, in one example, is defined as converting the display from a vertical display to a horizontal display, or converting the display from a horizontal display to a vertical display.

Figure 16:
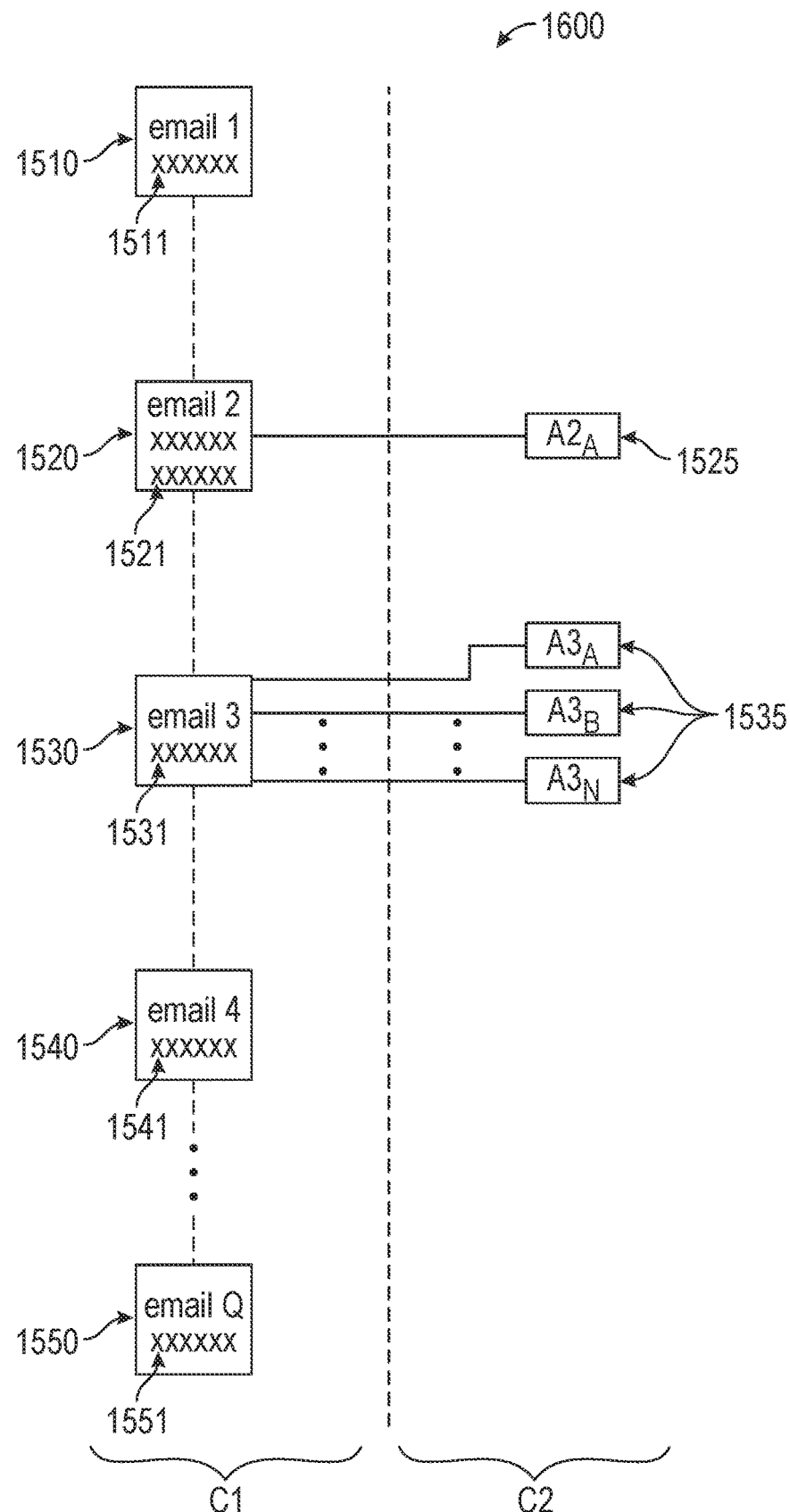
FIG. 16 illustrates an example display of the e-mail string of FIG. 15 in a horizontal manner.

FIG. 16 illustrates an example display 1600 of the e-mail string of FIG. 15 in a horizontal manner. As shown in FIG. 16, the email string includes Q quantity of e-mails which are labeled as email1 through emailQ. As labeled in FIG. 15, email1 is labeled as 1510, email is labeled as 1520, email3 is labeled as 1530, e-mail4 is labeled as 1540, emailQ is labeled as 1550. One skilled in the art would understand that "Q" could include any quantity of emails in the e-mail string. As shown in FIG. 15, email1 1510 includes email body 1511, email 1520 includes email body 1521 and one email attachment 1525 labeled as "$A2_A$", email3 1530 includes e-mail body 1531 and N quantity of email attachments 1535 labeled as "$A3_A, A3_B \ldots A3_N$", email4 1540 includes email body 1541, and emailQ 1550 includes email body 1551. One skilled in the art would understand that "N" could include any quantity of email attachments.

In one example, a horizontal display is defined as displaying the relationship of an email string in a horizontal manner. That is, although the chronological relationship of each email is still displayed in a vertical manner (e.g., the email with the oldest chronological date may appear on the bottom while the email with the latest chronological date may appear on the top of the display, or vice versa), the email attachment(s) associated with each e-mail is displayed horizontally next to its respective e-mail. In one example, one or more e-mails (e.g., email1, email2, email 3, email4 . . . emailQ) is displayed in a scaled common image format (CIF). In one example, one or more of the email attachments is displayed in a scaled common image format (CIF). In one aspect, the display 1500 of FIG. 15 is flipped to result in the display 1600 of FIG. 16. In another aspect, the display 1600 of FIG. 16 is flipped to result in the display 1500 of FIG. 15.

In the example display of FIG. 16, the email bodies are displayed in column one (labeled as C1) while the respective email attachments are displayed in column two (labeled as C2). One skilled in the art would understand that although the email attachments are all displayed in column two in the example of FIG. 16, other examples of displaying the email attachments in more than one column are within the scope and spirit of the present disclosure. In one example, the email attachments may be sorted according to document types (e.g., pdf, WORD, PowerPoint, Excel, etc.), according to keywords, or any other manner of sorting. And, the email attachments may be displayed in different columns according to the sort. For example, all email attachments that are of a first document type may be displayed in a first column while other e-mail attachments of a second document type may be displayed in a second column. In one aspect, email attachments containing a first keyword may be displayed in a first column while email attachments containing a second keyword may be displayed in a second column. In the examples, the first and second columns for displaying the email attachments are different from the column for displaying the email bodies. In one aspect, a horizontal display of an email string is defined as displaying the email bodies in one column and displaying the email attachments in one or more columns other than the column displaying the email bodies. In one example, a keyword is a search text; that is, the keyword is used or is inputted for searching email bodies and/or email attachments in an email string.

Figure 17:
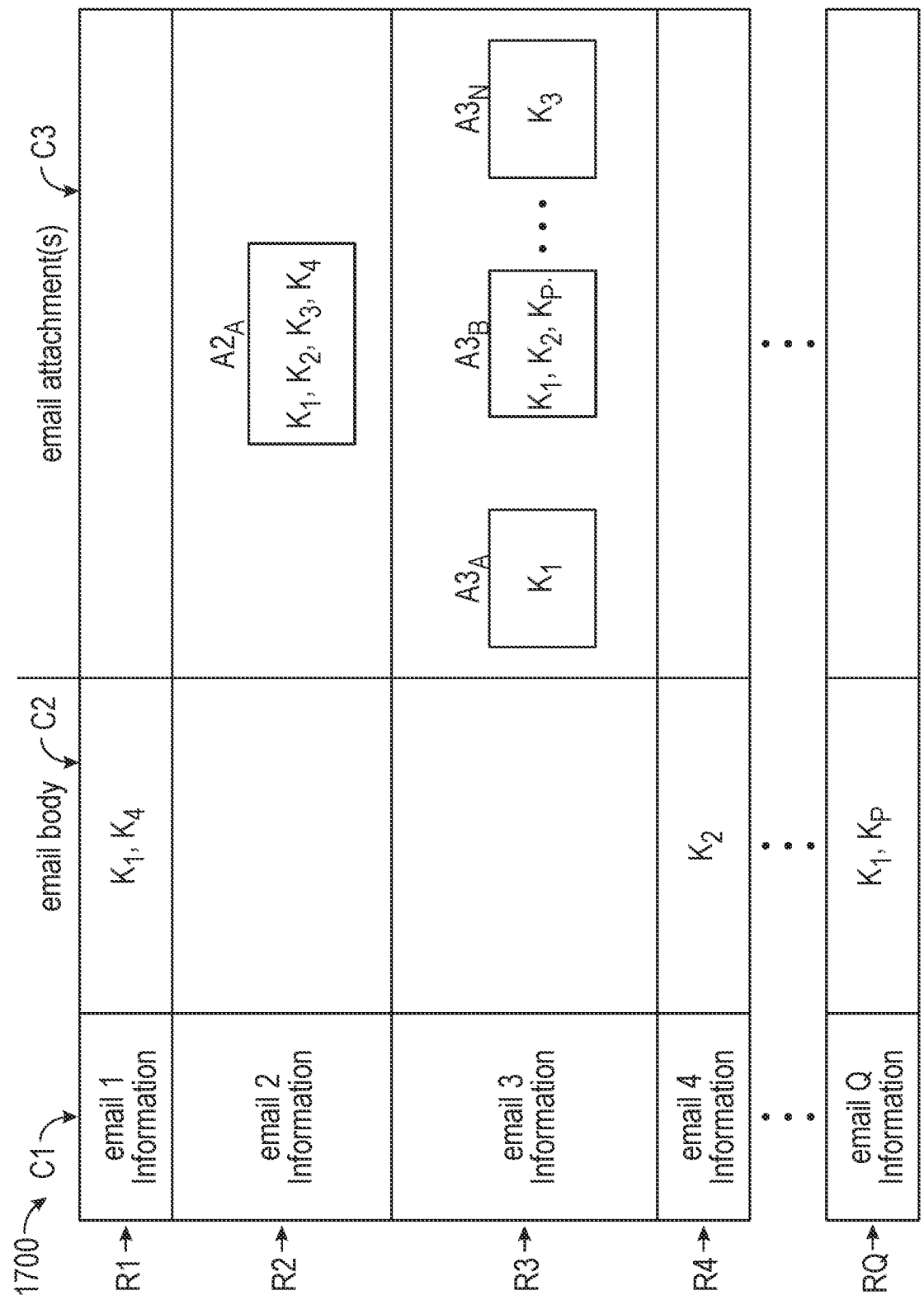
FIG. 17 illustrates a first example search result summary.

FIG. 17 illustrates a first example search result summary 1700. In FIG. 17, the e-mail string shown is the same as that shown in FIG. 15 and FIG. 16. In the example of FIG. 17, P quantity of search terms are used and are respectively labeled as $K_1, K_2, K_3, K_4 \ldots K_P$. One skilled in the art would understand that "P" could include any quantity of search terms. In one example, the search result summary 1700 includes three columns with column one C1, column two C2 and column three C3. As an example, column one C1 indicates the emails of the email string, column two C2 indicates the email body corresponding to the respective emails, and column three C3 indicates the email attachment(s) corresponding to the respective emails. In one example, column one C1 lists information (such as metadata) of the emails in the email string. Information of an email is referred to as email information. As an example, the information of email1 is referred to as email1 information, the information of email2 is referred to as email2 information, etc. For example, column one C1 may include the name of the sender, the name(s) of the recipient(s) which may or may not include recipients who are copied in the email or who are blind copied in the email, the date the email was sent, and/or the subject line of the email.

In one example, differential searching may be applied to the contents of the different columns. In one example, differential searching means that different search texts are used to search the contents of the different columns. For example, column one C1 may be associated with a first search text, column two C2 may be associated with a second search text, and column three C3 may be associated with a third search text. In one example, information of the emails (such as metadata) will be searched for occurrences of a first search text, the email bodies will be searched for occurrences of a second search text and the email attachments will be searched for occurrences of a third search text. In one example, each of the first search text, the second search text and the third search text is different from each other. In one example, one or more of the first search text, the second search text and the third search text are the same.

One skilled in the art would understand that although three columns are shown in FIG. 17, that other quantities of columns are also within the spirit and scope of the present disclosure. One skilled in the art would understand that although three search texts are mentioned, that other quantities of search text are within the spirit and scope of the present disclosure. One skilled in the art would understand that more than one search text may be used for searching the context of a column. In one example, the search result summary includes a minimum of three columns.

In one example, the search result summary 1700 includes Q quantity of rows, labeled as R1, R2, R3, R4 . . . RQ. The quantity Q is the same as the quantity of e-mails in the email string. In one example, the search result summary 1700 indicates the search terms that are present in the email bodies and/or email attachments. For example, in the box identified by row R1 and column C2, the labeling of $K_1$ and $K_4$ indicates that search terms $K_1$ and $K_4$ are found in the email body of email1. For example, in the box identified by row R2 and column C3, the labeling of $K_1$, $K_2$, $K_3$ and $K_4$ indicates that search terms $K_1$, $K_2$, $K_3$ and $K_4$ are found in the email attachment $A2_A$ of email2. For example, in the box identified by row R3 and column C3, the labeling of $K_1$, $K_2$, $K_P$ indicates that the search terms $K_1$, $K_2$, $K_P$ are found in the email attachment $A3_B$ of email, the labeling of $K_3$ indicates that the search term $K_3$ is found in the email attachment $A3_N$ of email, and the labeling of $K_1$ indicates that the search term $K_1$ is found in the email attachment $A3_A$ of email. For example, in the box identified by row R4 and column C2, the labeling of $K_2$ indicates that search term $K_2$ is found in the email body of email4. For example, in the box identified by row RQ and column C2, the labeling of $K_1$ and $K_P$ indicates that search term $K_1$ and search term $K_P$ are found in the email body of emailQ.

Figure 18:
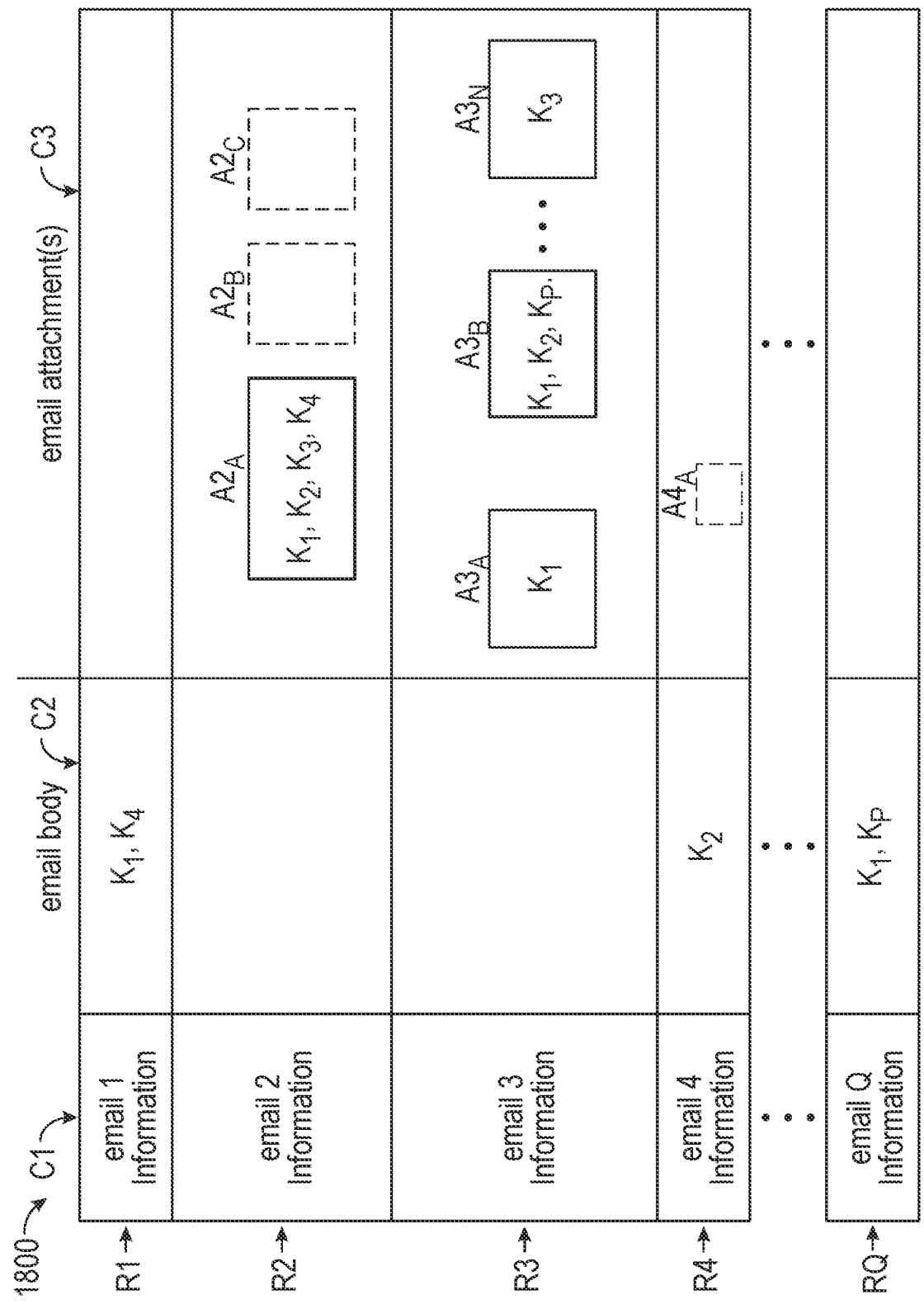
FIG. 18 illustrates a second example search result summary.

FIG. 18 illustrates a second example search result summary 1800. In one aspect, the display of the second example search result summary 1800 is similar to the display of the first example search result summary 1700 with an additional feature of showing all the attachments associated with all the emails displayed in column C1. In one example, for each e-mail with attachments, there's a distinction in how the attachments are displayed between the attachments that contain one or more of the keywords versus the attachments that do not contain any keywords. For example, attachments without any search terms may be shown in phantom (i.e., displayed in phantom format). As shown in FIG. 18, attachments $A2_B$ and $A2_C$ are shown as dashed lines to indicate that although they are attachments to email2, they do not contain any search terms. In one example, an email attachment shown as dashed lines is in phantom format. Similarly, attachment $A4_A$ is an attachment associated with email4 but attachment $A4_A$ does not contain any search terms. For example, attachments that contain one or more search terms may be displayed with one or more symbols (e.g., $K_1$, $K_2$, $K_3$ . . . $K_p$) whereas attachments without any search terms may be displayed without any search term symbols. In the example of email2, attachment $A2_A$ is shown with symbols (e.g., $K_1$, $K_2$, $K_3$, $K_4$) to indicate that four search terms $K_1$, $K_2$, $K_3$, $K_4$ are found within attachment $A2_A$. However, attachments $A2_B$ and $A2_C$ are shown without any symbols which indicate that no search terms are found in either attachments $A2_B$ or $A2_C$. For example, attachments that contain one or more search terms may be bolded (e.g., around its borders) while attachments without any search terms may not be bolded. In one aspect, the attachments that contain one or more search terms are displayed differently than the attachments that do not contain any search terms.

Figure 19:
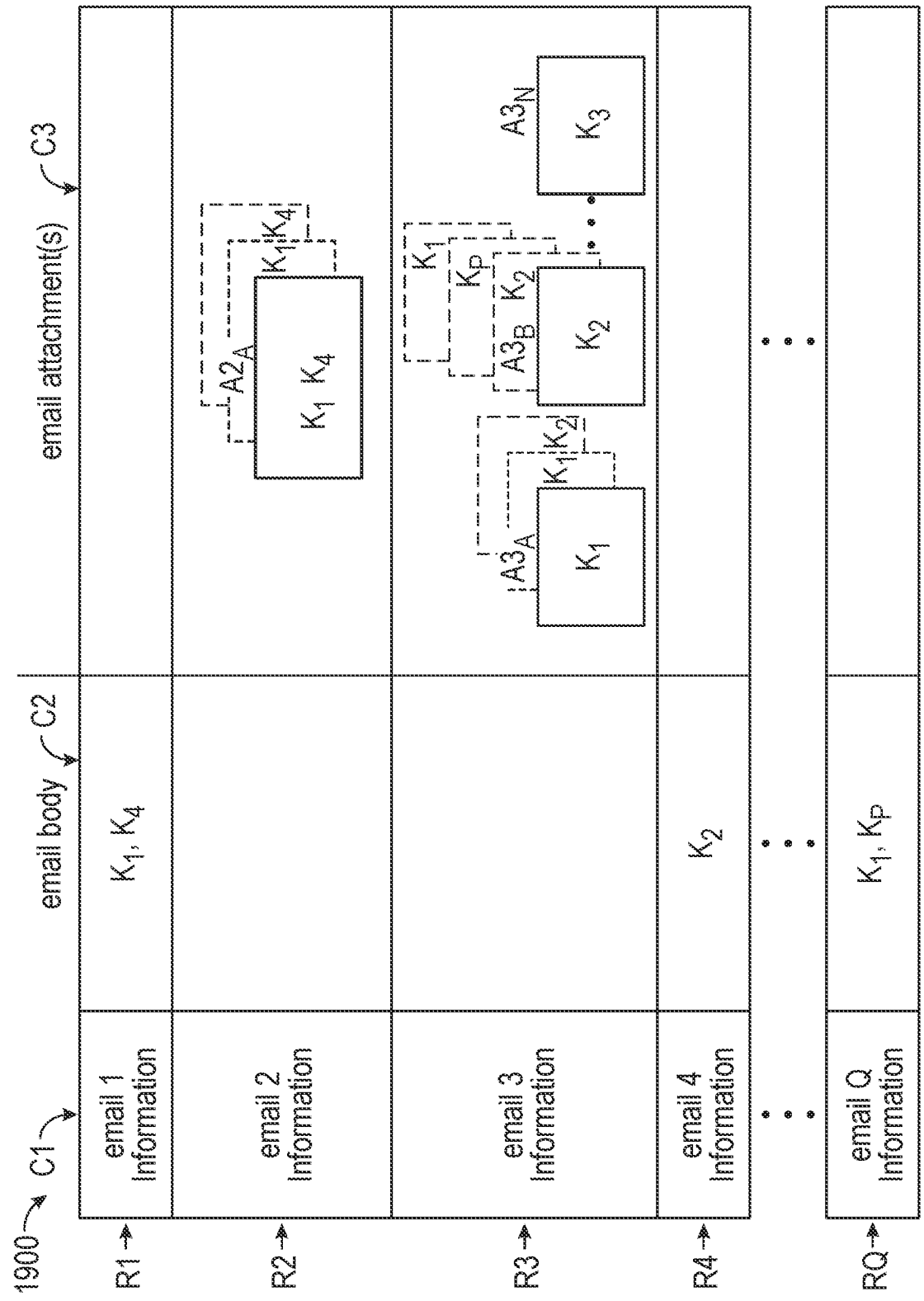
FIG. 19 illustrates a third example search result summary.

FIG. 19 illustrates a third example search result summary 1900. In one aspect, the display of the third example search result summary 1900 is similar to the display of the first example search result summary 1700 with an additional feature of showing the email attachments in column C3 as multiple pages if search terms are found in multiple pages of the email attachments. For example, in the box identified by row R2 and column C3, four search terms $K_1$, $K_2$, $K_3$, $K_4$ are found in the email attachment $A2_A$. As shown, search terms $K_2$ and $K_3$ are on the first page of the email attachment $A2_A$ while search terms $K_1$ and $K_4$ are on subsequent pages of the email attachment $A2_A$. As an example, the email attachment $A2_A$ is displayed as multiple pages, for example, with a solid line rectangle representing one page and additional dashed line rectangles representing additional pages. In one example, the exact page(s) of where the search terms appear on the email attachment $A2_A$ may be indicated, for example, by corresponding page numbers.

For example, in the box identified by row R3 and column C3, four search terms $K_1$, $K_2$, $K_3$, $K_p$ are found in the email attachments $A3_A$, $A3_B$, and $A3_N$. As indicated by a three-dimensional (3D) representation of the email attachment $A3_A$, the search term $K_1$ appears in the email attachment $A3_A$ on multiple pages. As indicated by a three-dimensional (3D) representation of the email attachment $A3_B$, multiple search terms $K_1$, $K_2$, $K_p$ appear in the email attachment $A3_B$ on multiple pages. In the example of the email attachment $A3_B$, search term $K_2$ appears on the first two pages shown, search term $K_p$ appears on the third page shown and search term $K_1$ appears on the fourth page shown. As indicated by a two-dimensional (2D) representation of the email attachment $A3_N$, the search term $K_3$ appears in the email attachment $A3_N$ on a single page. In one example, the 3D representation is represented as multiple pages with a solid line rectangle and additional dashed line rectangle(s).

In one example, the email attachments $A2_A$, $A3_A$, $A3_B$ are only shown with pages that include a search term. However, one skilled in the art would understand that any e-mail attachments may be shown with all its pages, whether or not the pages include a search term. Additionally, a user may elect to show some email attachments with only pages where one or more search term is found and some email attachments with all its pages regardless of whether or not a search term is found in a page.

In one aspect, the contents of any of the example search result summaries of FIGS. 17, 18 and/or 19 may be shown as progressive relationships in three or more displays. In one example, the contents of column C1 are shown in a first display. The contents of columns C2 and C3 are shown in a second display, wherein the relationships of the email bodies and the attachment(s) to particular emails of column C1 are preserved. That is, there are one-to-one mappings of an email body (in column C2) to an email (in column C1), and there are one-to-one mappings of each attachment (in column C3) to a corresponding email (in column C1). In one example, a third display shows only pages selected from either column C2 or column C3. That is, a user may choose either an email body from column C2 or an attachment from column C3, and only pages which contain the key terms from the chosen email body or the chosen attachment will be shown in the third display. In one example, a fourth display may show a single page from the third display. In one example, the content of the fourth display is chosen by the user. In one example, the user may choose what to show in a subsequent display by clicking on a page of a document or a particular document shown in a previous display.

In one aspect, the contents of any of the example search result summaries of FIGS. 17, 18 and/or 19 may be shown as progressive relationships in three or more displays. In one example, a first display shows the search result summary (e.g., from any one of FIGS. 17, 18, 19). The second display may show only pages with the search terms. For example, if a user clicks on a particular row (e.g., any of R1, R2, R3. R4 . . . RQ) of column C3, the only pages with the search terms of all the attachments in that row and column C3 will be shown in the second display. Using FIG. 17 as an example, if the user clicks on row R2 of column C3, the only pages of attachment $A2_A$ with the search terms will be shown in the second display. Note that no page from email attachments $A2_B$ and $A2_C$ will be shown in the second display since these two email attachments do not contain any of the search terms.

If, the user clicks on row R3 of column C3, the only pages of all the attachments $A3_A$, $A3_B$ . . . $A3_N$ with the search terms will be shown in the second display. If the user clicks on row R1 of column C3, nothing will be shown in the second display since email1 does not include any attachments. Also, even if email1 includes an email attachment, if the email attachment does not contain any of the search term, nothing will be shown in the second display if the user clicks on row R1 of column C3. If the user clicks on any row of column C2, the corresponding email body will be shown in the second display if the corresponding e-mail body contains one or more search terms. For example, clicking on row 1 of column C2 will display the email body of email1 since it contains search terms $K_1$ and $K_4$. However, clicking on row R2 of column C2 will result in nothing showing in the second display since the email body of email2 does not contain any search terms.

In one example, if the user clicks on any row of column C1, the corresponding email body and any email attachments of that email will be shown in the second display if the corresponding e-mail body and any email attachments contain one or more search terms. Thus, the second display will show the email body of the email and the only pages with the search terms from all the email attachments associated with the email.

In one example, a third display may show a single page from the second display. In one example, the content of the third display is chosen by the user. In one example, the user may choose what to show in a subsequent display by clicking on a page of a document shown in a previous display.

Figure 20:
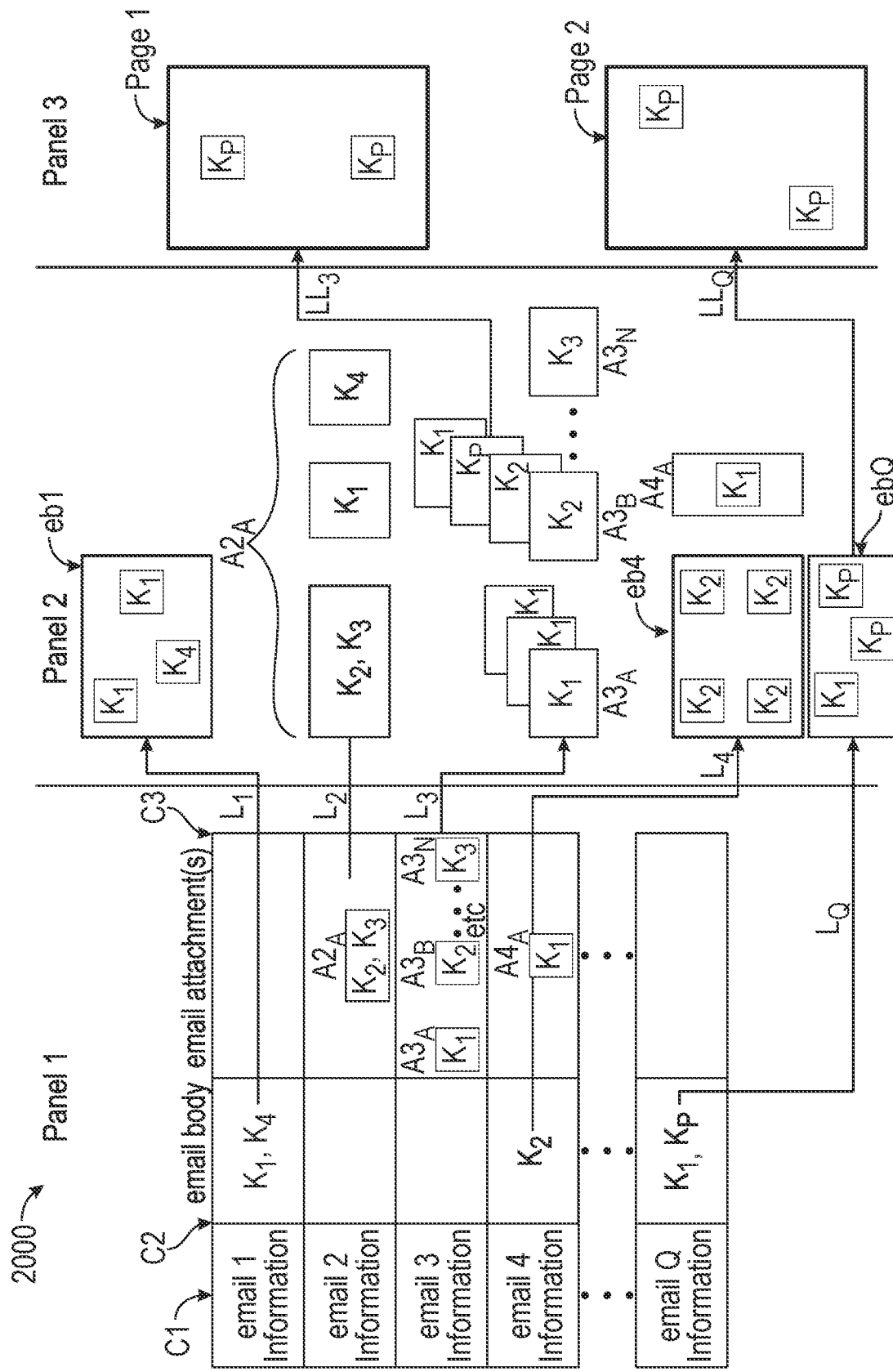
FIG. 20 illustrates an example of a progressive display of three panels: Panel 1, Panel 2, Panel 3.

FIG. 20 illustrates an example of a progressive display 2000 of three panels: Panel 1, Panel 2, Panel 3. In the example of FIG. 20, Panel 1 displays a search result summary. In one example, the search result summary shown in Panel 1 is similar to the search result summary shown in FIG. 17. For example, the search result summary shown in FIG. 20 includes three columns with column one C 1, column two C2 and column three C3. As an example, column one C1 indicates the emails of the email string, column two C2 indicates the email body corresponding to the respective emails, and column three C3 indicates the email attachment(s) corresponding to the respective emails.

Panel 2 displays multiple pages wherein each page includes at least one search term. In one example, the multiple pages displayed in Panel 2 may include pages from the email body of column C2 and/or pages from the email attachments shown in column C3 associated with the emails shown in column C1. In one example, each page displayed in Panel 2 is shown with at least one symbol ($K_1$, $K_2$, $K_3$, $K_4$ . . . $K_P$) to indicate which search term(s) the page includes. In one example, if an attachment includes multiple pages that contain search terms, the multiple pages of that attachment may be shown as multiple pages stacked on top of each other (see attachments $A3_A$ and $A3_B$ as examples). In one example, the multiple pages displayed in Panel 2 are only pages associated with one or more search terms. In one example, the only pages may be prioritized using a particular condition for display. A particular condition may be the quantity of search terms on a page. For example, only pages with all search terms found in each of the only pages will be displayed in panel 2 first before displaying other only pages with fewer than all the search terms.

In one example, a first set of links ($L_1$, $L_2$, $L_3$, $L_4$ . . . $L_Q$) is included to show the relationships between the search result summary shown in Panel 1 and the multiple pages displayed in Panel 2. For example, link $L_1$ shows the relationship of the email body of email1 and the page eb1 displayed in Panel 2. For example, link $L_2$ shows the relationship of attachment $A2_A$ shown in Panel 1 and the pages (labeled as $A2_A$) in Panel 2. The other links ($L_3$, $L_4$ . . . $L_Q$) show similar relationships between the search result summary shown in Panel 1 and the respective multiple pages displayed in Panel 2. In the example of email4, both the email body eb4 and its attachment $A4_A$ each contains at least one search term. Thus, Panel 2 shows both the email body eb4 and the attachment $A4_A$, and link $L_4$ shows the relationship of the email body eb4 and the attachment $A4_A$ to email4.

Panel 3 displays one or more selected pages from the multiple pages displayed in Panel 2. In one example, a selection is made so that Panel 3 only shows pages from the multiple pages displayed in Panel 2 with the search term $K_P$. One skilled in the art would understand that it is within the spirit and scope of the present disclosure to include selections based on more than one search term. That is, in another example, the selection may include multiple search terms, for example, Panel 3 may display pages that contain one or more selected search terms.

Although not illustrated in FIG. 20, Panel 3 may also display pages chosen by a user based on the multiple pages displayed in Panel 2. That is, a user may choose to display in Panel 3 any of the multiple pages shown in Panel 2. And, in another example, Panel 3 may display pages that contain one or more selected search terms along with pages chosen by a user that may not contain any of the selected search terms.

In one example, a second set of links, indicated by "$ll_x$" where "x" identifies the email, is included to show the relationships between the multiple pages displayed in Panel 2 and the pages displayed in Panel 3. For example, $ll_3$ indicates that page 1 displayed in Panel 3 is a page from attachment $A3_B$ displayed in Panel 2. For example, $ll_q$ indicates that page 2 displayed in Panel 3 is a page from email body ebq displayed in Panel 2. In one aspect, the page(s) shown in Panels 2 or 3 may highlight only the selected search term but not highlight other remaining search terms on the pages. In another example, not shown in FIG. 20, Panel 4 may show a single page chosen, for example, by a user, wherein the single page may be chosen from the contents of any of the other previous panels. In one example, the displays of FIG. 20 may include only the contents of Panel 1, Panel 3 and Panel 4. In this example, the contents of Panel 3 are selected based on one or more search terms.

In one example, emails are related (i.e., "related emails") if they belong to the same email thread. That is, emails are related if they are part of a running list of all the successive replies starting with an original email. In one example, the original email is part of the email string. In one example, individual emails belonging to the same email thread in the email body may be displayed as individual sub-documents displayed in a scaled common image format (CIF) in panel C2.

In one aspect, although the present disclosure discusses displaying in scaled common image format (CIF) or in common image format, the displays discussed in the present disclosure are also applicable to scaled format. Scaled formats may not include a different sized replica of the image of the original document. In one example, a scaled format of a document may be a digital representation which includes the contents of the document, wherein the digital representation is displayed in a different size (smaller or larger) representation of the original document. In one example, a scaled format is a different sized digital representation of the native format of the document. For example, a document with WORD format as its native format may be presented in a scaled format as a different sized digital representation also in WORD format.

One skilled in the art would understand that the steps disclosed in the example flow diagrams of the present disclosure may be interchanged in their order without departing from the scope and spirit of the present disclosure. Also, one skilled in the art would understand that the steps illustrated in the flow diagrams are not exclusive and other steps may be included or one or more of the steps in the example flow diagrams may be deleted without affecting the scope and spirit of the present disclosure.

Those of skill would further appreciate that the various illustrative components, logical blocks and/or algorithm steps described in connection with the examples disclosed herein may be implemented as electronic hardware, firmware, computer software, or combinations thereof. To clearly illustrate this interchangeability of hardware, firmware and software, various illustrative components, logical blocks and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for the various steps described in the blocks of the flow diagrams, implementation may include hardware and/or software. In some example, a memory controller residing in the host or external to the host may house the hardware and/or software. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks and/or algorithm steps described herein may also be coded as computer-readable instructions carried on any computer-readable medium known in the art or implemented in any computer program product known in the art. In one aspect, the computer-readable medium includes non-transitory computer-readable medium.

Computer-readable medium may include both computer storage media and communication media including any medium that facilitates transfer of a computer program from one place to another. A storage media may be any available media that can be accessed by a computer. By way of example, and not limitation, such computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
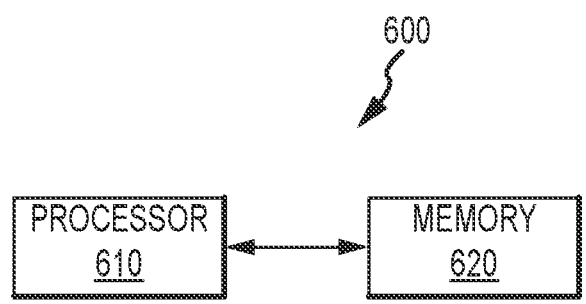
FIG. 6 illustrates an example of a device comprising a processor in communication with a memory for executing the algorithms in the flow diagrams illustrated in FIGS. 1 and 12.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. For example, FIG. 6 illustrates an example of a device 600 comprising a processor 610 in communication with a memory 620 for executing the algorithms in the flow diagrams illustrated in the present disclosure. In one aspect, the memory 620 is located within the processor 610. In another aspect, the memory 620 is external to the processor 610. In one aspect, the processor includes circuitry for implementing or performing the various flow diagrams, logical blocks and/or modules described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for searching, displaying and storing in a non-transitory computer-readable medium, the method comprising:
searching database for at least one document containing a search text;
displaying a progressive relationship of a first display with a second display with a third display, wherein the displaying includes the following:
the first display presenting the at least one document;
the second display presenting only pages from the at least one document, wherein each of the only pages contains the search text; and
the third display presenting one of the only pages, and wherein the search text in the one of the only pages is highlighted; and wherein the first display is adjacent to the second display, and the second display is adjacent to the third display, and the first display, the second display and the third display are displayed horizontally adjacent.

2. The method of claim 1, wherein the first display, the second display and the third display are displayed vertically adjacent.

3. The method of claim 1, wherein the second display is shown as a partial display area.

4. The method of claim 3, wherein the third display is shown as a partial display area.

5. The method of claim 4, wherein the first display is shown as a partial display area.

6. The method of claim 1, wherein the only pages are from a single document.

7. The method of claim 1, wherein the only pages are from a single document.

8. The method of claim 1, further comprising selecting the one of the only pages to be presented as the third display.

9. An apparatus for searching and displaying, the apparatus comprising:
  an input configured to receive a search text;
  a processor coupled to the input, the processor configured to search a database for at least one document containing the search text and configured to display a progressive relationship of a first display with a second display with a third display, wherein:
  a first display panel configured to present the first display presenting the at least one document;
  a second display panel configured to present the second display presenting only pages from the at least one document, wherein each of the only pages contains the search text;
  a third display panel configured to present the third display presenting one of the only pages, and wherein the search text in the one of the only pages is highlighted; and
  a non-transitory memory coupled to the processor, the non-transitory memory configured to store one or more of the search text and the at least one document; and wherein the first display is adjacent to the second display, and the second display is adjacent to the third display, and the first display, the second display and the third display are displayed horizontally adjacent.

10. The apparatus of claim 9, wherein the first display, the second display and the third display are presented as vertically adjacent.

11. The apparatus of claim 9, wherein the second display is shown as a partial display area.

12. The apparatus of claim 11, wherein the third display is shown as a partial display area.

13. The apparatus of claim 12, wherein the first display is shown as a partial display area.

14. The apparatus of claim 9, wherein the only pages are from a single document.

15. The apparatus of claim 9, wherein the only pages are from a single document.

16. A non-transitory computer-readable medium storing computer executable code, operable on a device comprising at least one processor and at least one memory coupled to the at least one processor, wherein the at least one processor is configured to implement searching and displaying, the computer executable code comprising:
  instructions for causing a computer to search database for at least one document containing a search text; and
  instructions for causing the computer to display a progressive relationship of a first display with a second display with a third display, wherein the displaying includes the following:
  the first display presenting the at least one document;
  the second display presenting only pages from the at least one document, wherein each of the only pages contains the search text; and
  the third display presenting one of the only pages, and wherein the search text in the one of the only pages is highlighted; and
  wherein the first display is adjacent to the second display, and the second display is adjacent to the third display, and the first display, the second display and the third display are displayed horizontally adjacent.

* * * * *